(12) United States Patent
Mullen

(10) Patent No.: US 9,958,934 B1
(45) Date of Patent: May 1, 2018

(54) HOME AND PORTABLE AUGMENTED REALITY AND VIRTUAL REALITY VIDEO GAME CONSOLES

(76) Inventor: Jeffrey D. Mullen, New York, NY (US)

( * ) Notice: Subject to any disclaimer, the term of this patent is extended or adjusted under 35 U.S.C. 154(b) by 90 days.

(21) Appl. No.: 11/742,694

(22) Filed: May 1, 2007

Related U.S. Application Data

(60) Provisional application No. 60/796,772, filed on May 1, 2006, provisional application No. 60/798,826, filed on May 9, 2006.

(51) Int. Cl.
*A63F 13/212* (2014.01)
*G06F 3/01* (2006.01)
*G02B 27/01* (2006.01)

(52) U.S. Cl.
CPC ............ *G06F 3/011* (2013.01); *A63F 13/212* (2014.09); *G02B 27/017* (2013.01); *A63F 2300/1062* (2013.01); *A63F 2300/8082* (2013.01)

(58) Field of Classification Search
CPC .............. A63F 13/06; A63F 2300/1025; A63F 2300/8076; A63F 2300/8082; G06F 3/011; G02B 27/0093; G02B 6/354; G02B 27/017; G06T 11/00; G06T 7/00
USPC ........................................ 463/30–32; 345/1.1
See application file for complete search history.

(56) References Cited

U.S. PATENT DOCUMENTS

| | | | |
|---|---|---|---|
| 4,582,324 A * | 4/1986 | Koza ........................ | A63F 13/12 463/16 |
| 5,139,261 A | 8/1992 | Openiano | |
| 5,436,638 A * | 7/1995 | Bolas ........................ | G06F 3/016 273/148 B |
| 5,523,890 A | 6/1996 | Reaney | |
| 5,588,914 A * | 12/1996 | Adamczyk ........................ | 463/32 |
| 5,662,523 A * | 9/1997 | Yasumaru et al. ............... | 463/30 |
| 5,690,551 A * | 11/1997 | Taki et al. ........................ | 463/32 |
| 5,724,660 A | 3/1998 | Kauser et al. | |
| 5,741,182 A | 4/1998 | Lipps et al. | |
| 5,793,606 A * | 8/1998 | Cubbage ............... | G06F 1/1601 361/679.29 |
| 5,802,274 A | 9/1998 | Dorak et al. | |
| 5,902,343 A | 5/1999 | Hale et al. | |
| 5,905,499 A * | 5/1999 | McDowall et al. .......... | 345/419 |
| 5,913,727 A * | 6/1999 | Ahdoot ........................ | 463/39 |
| 5,926,264 A * | 7/1999 | Beale ........................ | G06F 3/012 345/158 |
| 5,953,000 A * | 9/1999 | Weirich ................ | G01S 5/0247 345/158 |

(Continued)

FOREIGN PATENT DOCUMENTS

WO     WO02073287 A2     9/1992

OTHER PUBLICATIONS

Antti Kotanen, Marko Hannikainen, Helena Leppakoski, Timo D. Hamalainen "Experimnets with Bluetooth" Proeedings of the International Conferene on Information Technology: Computers and Communications (ITCC '03) Apr. 2003.

(Continued)

*Primary Examiner* — William H McCulloch, Jr.

(57) ABSTRACT

Systems and methods are provided for portable or stationary virtual reality and augmented reality video game systems. A game system that is operable of providing visual information to numerous head mounted displays are provided. A game system that is operable to receive, and recharge, numerous rechargeable batteries is also provided.

11 Claims, 19 Drawing Sheets

(56) References Cited

U.S. PATENT DOCUMENTS

| | | | |
|---|---|---|---|
| 5,976,017 A * | 11/1999 | Omori et al. ................ 463/32 |
| 5,977,935 A * | 11/1999 | Yasukawa ........... G02B 27/017 |
| | | | 340/980 |
| 5,999,808 A | 12/1999 | LaDue |
| 6,011,653 A | 1/2000 | Karasawa |
| 6,015,344 A | 1/2000 | Kelly et al. |
| 6,028,593 A | 2/2000 | Rosenberg |
| 6,080,063 A | 6/2000 | Khosla |
| 6,106,397 A | 8/2000 | Phillips |
| 6,106,399 A | 8/2000 | Baker et al. |
| 6,124,825 A | 9/2000 | Eschenbach |
| 6,128,004 A * | 10/2000 | McDowall ............. G06F 3/014 |
| | | | 345/156 |
| 6,285,370 B1 * | 9/2001 | McDowall ........... G06T 15/10 |
| | | | 345/419 |
| 6,287,200 B1 | 9/2001 | Sharma |
| 6,317,127 B1 * | 11/2001 | Daily ..................... G06T 15/10 |
| | | | 345/629 |
| 6,337,688 B1 | 1/2002 | Berstis |
| 6,342,892 B1 * | 1/2002 | Van Hook et al. ........... 345/503 |
| 6,378,390 B2 | 4/2002 | Saito |
| 6,441,815 B1 * | 8/2002 | McDowall ........... G06T 15/10 |
| | | | 345/419 |
| 6,478,680 B1 * | 11/2002 | Yoshioka et al. ............... 463/43 |
| 6,520,853 B2 | 2/2003 | Suzuki |
| 6,522,312 B2 | 2/2003 | Ohshima et al. |
| 6,527,641 B1 | 3/2003 | Sinclair et al. |
| 6,585,596 B1 * | 7/2003 | Leifer et al. ..................... 463/39 |
| 6,545,661 B1 | 8/2003 | Goschy et al. |
| 6,625,299 B1 | 9/2003 | Meisner et al. |
| 6,630,915 B1 * | 10/2003 | Flood .................... G02B 27/017 |
| | | | 345/8 |
| 6,633,267 B2 | 10/2003 | Numa |
| 6,633,304 B2 | 10/2003 | Anabuki |
| 6,663,105 B1 | 12/2003 | Sullivan et al. |
| 6,690,947 B1 | 2/2004 | Tom |
| 6,735,435 B2 | 5/2004 | Newell et al. |
| 6,850,844 B1 | 2/2005 | Walters et al. |
| 6,853,935 B2 | 2/2005 | Satch et al. |
| 6,872,139 B2 | 3/2005 | Sato et al. |
| 6,951,515 B2 | 10/2005 | Ohshima et al. |
| 6,961,055 B2 | 11/2005 | Doak et al. |
| 6,972,734 B1 | 12/2005 | Ohshima et al. |
| 6,992,462 B1 * | 1/2006 | Hussaini et al. ................ 320/114 |
| 7,038,699 B2 | 5/2006 | Sato et al. |
| 7,050,078 B2 | 5/2006 | Dempski |
| 7,056,216 B2 | 8/2006 | Ohshima et al. |
| 7,084,887 B1 | 8/2006 | Sato et al. |
| 7,173,765 B2 * | 2/2007 | Yamasaki ........... G02B 27/017 |
| | | | 345/8 |
| 7,303,474 B2 | 12/2007 | Anderson et al. |
| 7,312,786 B2 * | 12/2007 | Anderson ........... G06F 3/04845 |
| | | | 345/156 |
| 7,610,558 B2 * | 10/2009 | Morita .......................... 715/757 |
| 7,657,910 B1 | 2/2010 | McAulay et al. |
| 7,666,096 B2 * | 2/2010 | Novelo ............. H04N 13/0484 |
| | | | 273/461 |
| 7,746,029 B2 * | 6/2010 | Toya .................... H02J 7/0042 |
| | | | 320/107 |
| 7,900,068 B2 * | 3/2011 | Weststrate ............... G06F 1/26 |
| | | | 713/300 |
| 8,378,630 B2 * | 2/2013 | Navid ................... H01R 31/06 |
| | | | 320/113 |
| 8,467,133 B2 * | 6/2013 | Miller ................. G02B 27/017 |
| | | | 353/28 |
| 8,585,476 B2 * | 11/2013 | Mullen .................. A63F 13/12 |
| | | | 463/1 |
| 8,678,282 B1 * | 3/2014 | Black ........................ F41G 3/16 |
| | | | 235/13 |
| 9,215,304 B2 * | 12/2015 | Rosenblatt ............. H04M 1/05 |
| 2001/0003712 A1 * | 6/2001 | Roelofs ............................ 463/37 |
| 2001/0005689 A1 * | 6/2001 | Fujioka ................. A63F 13/12 |
| | | | 463/4 |
| 2001/0006908 A1 | 7/2001 | Fujioka et al. |
| 2001/0008846 A1 * | 7/2001 | Yamauchi .............. A63F 13/005 |
| | | | 463/31 |
| 2001/0031662 A1 * | 10/2001 | Larian ............................. 463/36 |
| 2001/0035845 A1 * | 11/2001 | Zwern ................................. 345/8 |
| 2001/0040591 A1 | 11/2001 | Abbott et al. |
| 2001/0054019 A1 | 12/2001 | de Fabrega |
| 2001/0056574 A1 * | 12/2001 | Richards ................ G06F 3/011 |
| | | | 725/36 |
| 2002/0010021 A1 * | 1/2002 | McCauley ....................... 463/37 |
| 2002/0052933 A1 | 5/2002 | Leonhard et al. |
| 2002/0061741 A1 | 5/2002 | Leung et al. |
| 2002/0063655 A1 | 5/2002 | Aoyama |
| 2002/0072416 A1 * | 6/2002 | Ohshima ................. G06F 3/011 |
| | | | 463/43 |
| 2002/0082068 A1 | 6/2002 | Singhai |
| 2002/0082082 A1 | 6/2002 | Stamper et al. |
| 2002/0086732 A1 | 7/2002 | Kirmse et al. |
| 2002/0090985 A1 | 7/2002 | Tochner et al. |
| 2002/0102992 A1 | 8/2002 | Koorapaty |
| 2002/0128063 A1 | 9/2002 | Kunieda et al. |
| 2002/0131404 A1 | 9/2002 | Mehta et al. |
| 2002/0158827 A1 * | 10/2002 | Zimmerman ......... G06F 3/0346 |
| | | | 345/88 |
| 2002/0175897 A1 * | 11/2002 | Pelosi ............................ 345/158 |
| 2002/0190861 A1 | 12/2002 | Wentworth |
| 2003/0020755 A1 * | 1/2003 | Lemelson ................ G06F 3/013 |
| | | | 715/786 |
| 2003/0027640 A1 * | 2/2003 | Jeffway et al. .................. 463/49 |
| 2003/0032478 A1 * | 2/2003 | Takahama et al. ............. 463/30 |
| 2003/0032484 A1 | 2/2003 | Ohshima |
| 2003/0062675 A1 | 4/2003 | Noro et al. |
| 2003/0064712 A1 * | 4/2003 | Gaston et al. ................. 455/414 |
| 2003/0100366 A1 * | 5/2003 | Nagase ............................ 463/33 |
| 2003/0134665 A1 | 7/2003 | Kato et al. |
| 2003/0134676 A1 * | 7/2003 | Kang ............................... 463/36 |
| 2003/0144047 A1 | 7/2003 | Sprogis |
| 2003/0171147 A1 | 9/2003 | Sinclair et al. |
| 2003/0186742 A1 * | 10/2003 | Lin ................................. 463/37 |
| 2003/0199317 A1 * | 10/2003 | McCauley ....................... 463/37 |
| 2003/0210228 A1 | 11/2003 | Ebersole et al. |
| 2003/0216179 A1 * | 11/2003 | Suzuki et al. .................. 463/35 |
| 2003/0217070 A1 | 11/2003 | Gotoh |
| 2003/0224855 A1 | 12/2003 | Cunningham |
| 2003/0229900 A1 * | 12/2003 | Reisman ........... G06F 17/30873 |
| | | | 725/87 |
| 2004/0014526 A1 * | 1/2004 | Kulas .............................. 463/43 |
| 2004/0046655 A1 | 3/2004 | Benes et al. |
| 2004/0053690 A1 | 3/2004 | Fogel et al. |
| 2004/0058732 A1 | 3/2004 | Plocionelli |
| 2004/0077393 A1 * | 4/2004 | Kim ........................ A63F 13/10 |
| | | | 463/2 |
| 2004/0128250 A1 | 7/2004 | Fox |
| 2004/0147318 A1 * | 7/2004 | Shahoian et al. ................ 463/36 |
| 2004/0164708 A1 * | 8/2004 | Veselic ................... H02J 7/0068 |
| | | | 320/132 |
| 2004/0164897 A1 | 8/2004 | Treadwell et al. |
| 2004/0201544 A1 * | 10/2004 | Love et al. .................... 345/1.1 |
| 2004/0224740 A1 | 11/2004 | Ball et al. |
| 2004/0248653 A1 | 12/2004 | Barros et al. |
| 2005/0009605 A1 * | 1/2005 | Rosenberg et al. ............. 463/36 |
| 2005/0009608 A1 | 1/2005 | Roberts et al. |
| 2005/0048987 A1 | 3/2005 | Glass |
| 2005/0078274 A1 * | 4/2005 | Howell .................... G02C 11/10 |
| | | | 351/158 |
| 2005/0135390 A1 * | 6/2005 | Anderson ........... H04L 12/6418 |
| | | | 370/401 |
| 2005/0255912 A1 * | 11/2005 | Love et al. ...................... 463/30 |
| 2006/0017657 A1 * | 1/2006 | Yamasaki ............ G02B 27/017 |
| | | | 345/8 |
| 2006/0018027 A1 * | 1/2006 | Yamasaki ............ G02B 27/017 |
| | | | 359/631 |
| 2006/0094492 A1 * | 5/2006 | Wolfe ...................... G07F 17/32 |
| | | | 463/17 |
| 2006/0105838 A1 * | 5/2006 | Mullen ............................ 463/31 |
| 2006/0110090 A1 * | 5/2006 | Ellwood, Jr. ........ G02B 27/017 |
| | | | 385/6 |

(56) References Cited

U.S. PATENT DOCUMENTS

| | | | |
|---|---|---|---|
| 2006/0111190 A1* | 5/2006 | Yoshino | A63F 13/00 463/45 |
| 2006/0119539 A1* | 6/2006 | Kato | G02B 27/0176 345/8 |
| 2006/0154710 A1 | 7/2006 | Serafat | |
| 2006/0154725 A1* | 7/2006 | Glaser et al. | 463/37 |
| 2006/0172801 A1* | 8/2006 | Hussaini et al. | 463/39 |
| 2006/0209013 A1* | 9/2006 | Fengels | G06F 3/0325 345/156 |
| 2006/0258420 A1* | 11/2006 | Mullen | 463/1 |
| 2006/0258454 A1* | 11/2006 | Brick | 463/36 |
| 2006/0279039 A1* | 12/2006 | Krieger | A63F 13/02 273/148 B |
| 2007/0220108 A1* | 9/2007 | Whitaker | G06F 3/017 709/217 |
| 2008/0174265 A1* | 7/2008 | Toya | H02J 7/0042 320/107 |
| 2008/0253315 A1 | 10/2008 | Bodlaender | |
| 2009/0073084 A1* | 3/2009 | Mullen | 345/8 |
| 2013/0344958 A1* | 12/2013 | Mullen | A63F 13/12 463/31 |
| 2014/0292808 A1* | 10/2014 | Mullen | G06F 1/1624 345/633 |
| 2014/0347798 A1* | 11/2014 | Mullen | G06F 1/1624 361/679.03 |

OTHER PUBLICATIONS

Pikmin, Dec. 2, 2001, Nintendo, instruction manual.

"First Person Indoor/outdoor Augmented Reality Application: ARQuake", written by Thomas et al, and published Feb. 2002.

Mortal Kombat instruction booklet for Super Nintendo, 1992, Licensed from Midway.

Mortal Kombat 4 (released Oct. 15, 1997). Published by Midway Games <http://en.wikipedia.org/w/index.php?title=Mortal_Kombat_4&printable=yes>.

Youtube.com Screenshot of Super Dodge Ball Walkthrough with Commentary (Part 1 of 2). Accessed: Dec. 14, 2010. http://www.youtube.com/watch?E1LUWmr64JA.

GameFAQs: Super Dodge Ball (NES) FAQ/Walkthrough by TOKADasrik. Accessed: Dec. 14, 2010. http://www.gamefaqs.com/nes/587662-super-dodge-ball/faqs/34823.

Halo: Combat Evolved, Wikipedia description, http://en.wikipedia.org/wiki/Halo_%28game%29.

Quake Game Manual, Release cira 1996.

Wikipedia, N-Gage (device), Oct. 7, 2003, https://en.wikipedia.org/wiki/N-Gage_(devie).

IGN, Call of Duty, Sep. 27, 2004. https://www.ign.com/artiles/2004/09/28/call-of-duty-6.

"Description of Journey Geolocation Game" published Nov. 4, 2004 accessible via URLhttps://web.archive.org/web/20041102005616/http://journey.mop/us.com/, 1 page.

* cited by examiner

1600
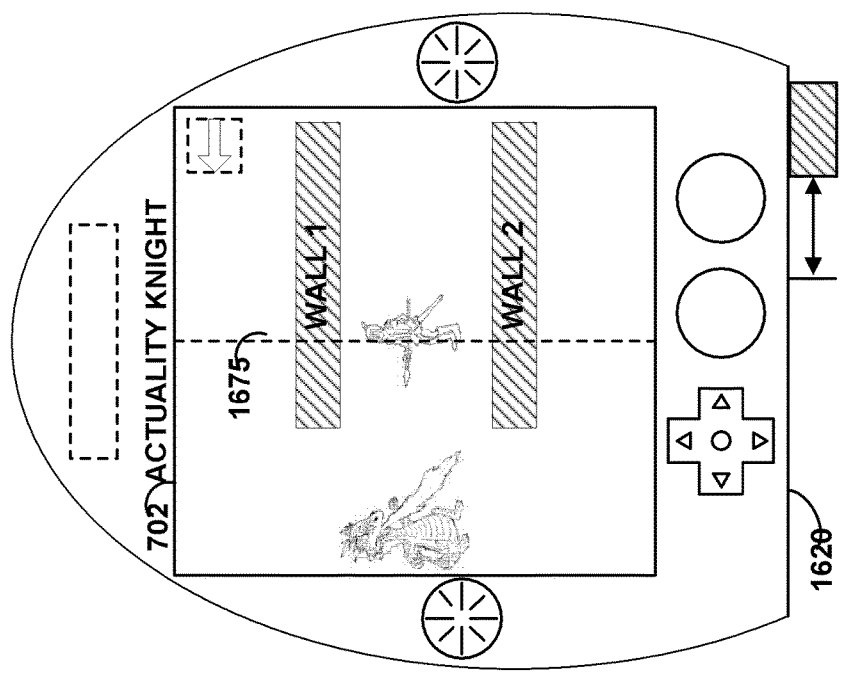
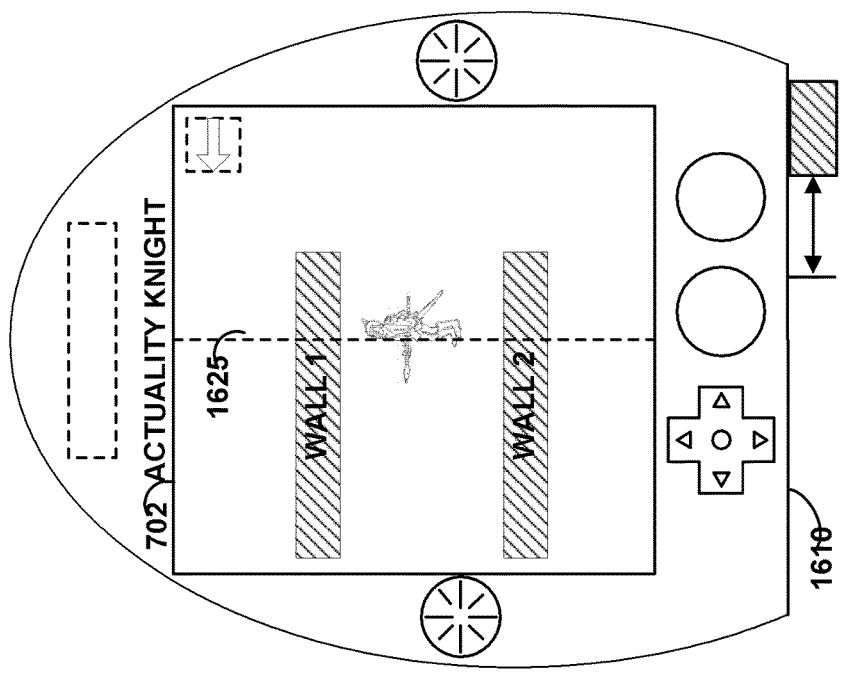
FIG. 16

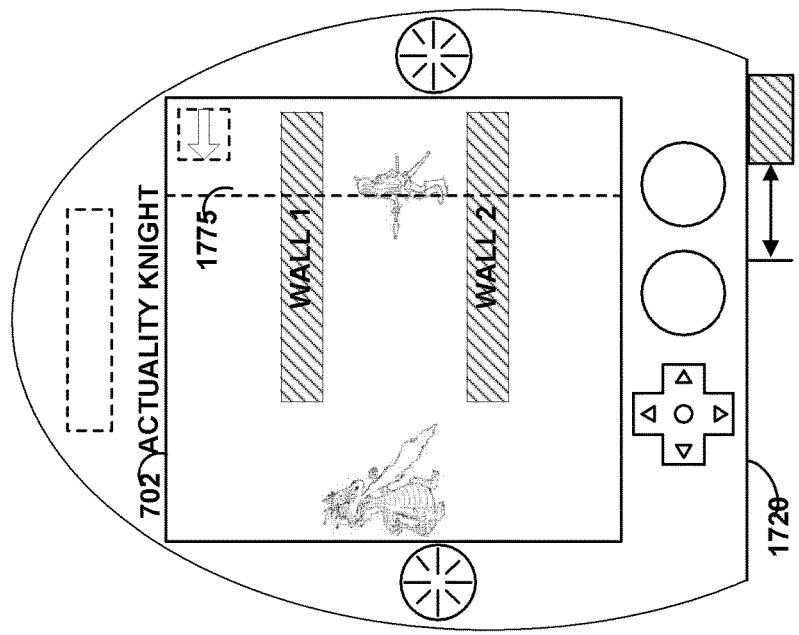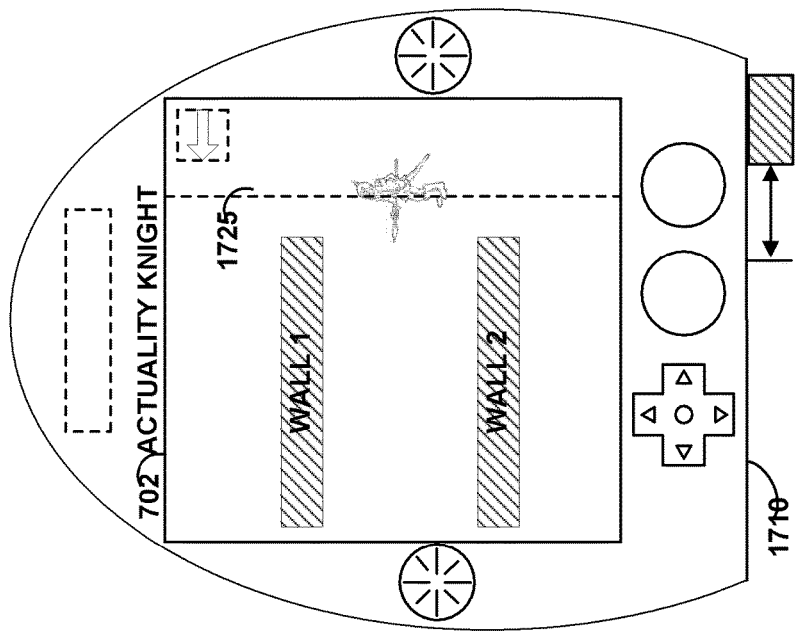
FIG. 17

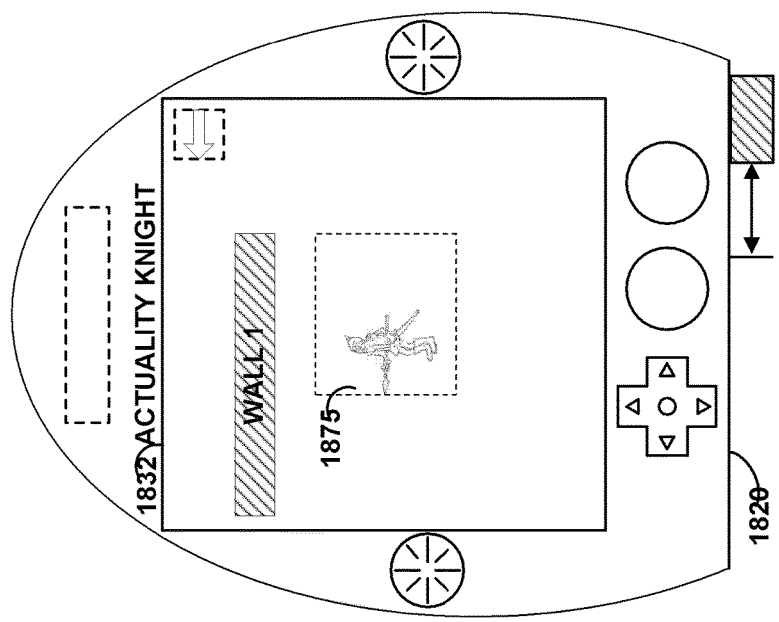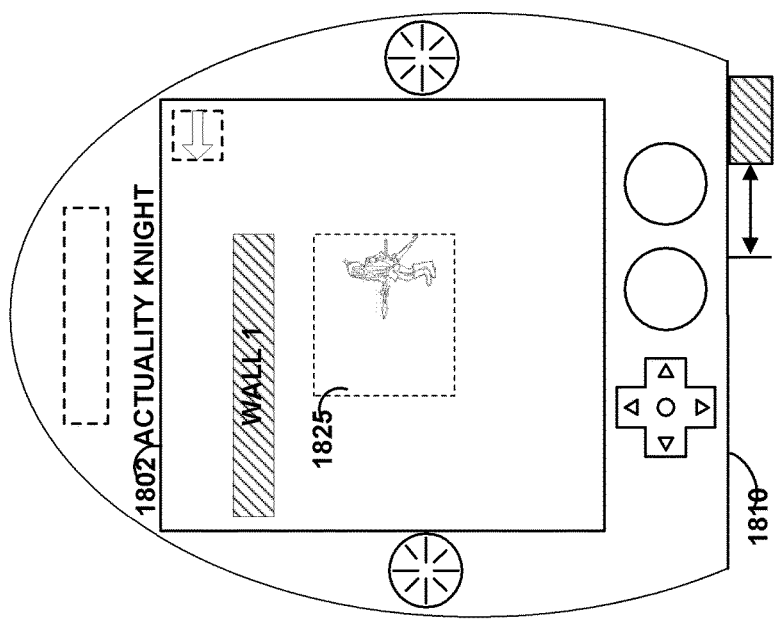
FIG. 18

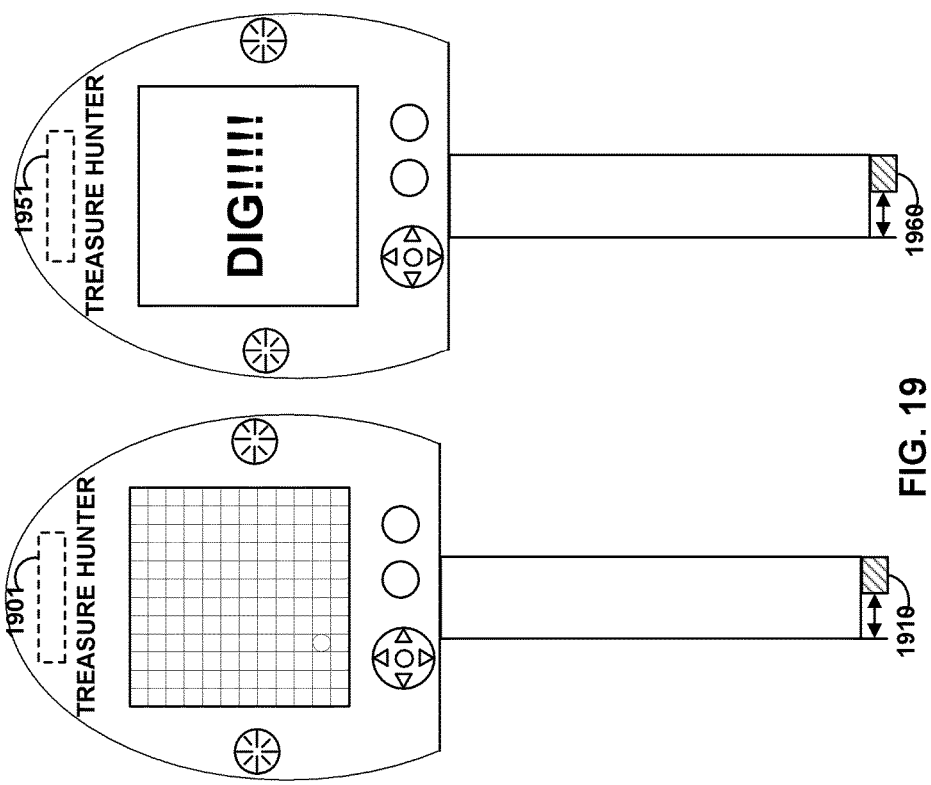

HOME AND PORTABLE AUGMENTED REALITY AND VIRTUAL REALITY VIDEO GAME CONSOLES

CROSS-REFERENCE TO RELATED APPLICATIONS

This application claims the benefit of Provisional Patent Application Nos. 60/796,772, filed on May 1, 2006, and 60/798,826, filed on May 9, 2006, both of which are hereby incorporated by reference herein in their entirety.

BACKGROUND OF THE INVENTION

This application generally relates to video games such as augmented reality and virtual reality video games.

Traditional video game consoles are connected to a single television set and are controlled by a single hand-held controller so that a single video game can be played. Although the processing power of video game systems has improved so that the resolution of the graphics of video games has increased, the way a user interacts with a video game has remained the same. A user still uses a single controller to control a video game that is displayed on a single television set. It is therefore desirable to offer a user an enhanced interaction experience with a video game.

SUMMARY OF THE INVENTION

Home and portable augmented reality and virtual reality video game systems are provided.

A home video game console is provided that has video and audio connections (e.g., one, two, three, or four or more connections) on the system such that Head Mounted Displays (HMDs) can be connected to the console (e.g., one, two, three, or four or more). In one embodiment, for example, one or more HMD audio/video connections are located on a front face of a video game system while one or more television audio/video connections are located on a rear face of the system (e.g., the face opposite that of the front face).

Additional controller connections may also be located on the console (e.g., on the front face of the console) such that, for example, hand-held controllers can also be electrically coupled to the video game system.

Connections may take many forms. For example, a video/audio/control connection may be provided that is operable to provide visual and audio data to a device as well as receive data from that device (or another device). As such, for example, a video/audio/control connection may provide audio and visual data to a HMD and may receive control data from the HMD. Examples of such control data may include, for example, the direction in which the HMD is facing as well as how the HMD moves. Inertial movement sensors (e.g., accelerometers) may be provided and control signals based on readings from these inertial movement sensors may be utilized to provide a control signal for a video game. One example of such an HMD-based video game control may be, for example, the direction and angle in which the video game displays a first-person perspective game at a particular moment. A video/audio/control connection may provide, and receive, signals from more than one device. For example, a video/audio/control connection may provide audio and visual data to an HMD as well as receive control data from a controller also connection to the video/audio/control connection (e.g., via a HMD). Persons skilled in the art will appreciate that any type of data may be provided in a video/audio/control connection to any device. For example, mechanical control data may be provided to an HMD or controller to direct the HMD or controller to vibrate ("rumble"). Connections may also be limited in the type of data the connection receives or provides to one or more devices. Any number of connections may be included on a console that provide and/or receive any type of video, audio, and/or control data. For example, four or more connections may be provided on a console to provide and/or receive data from HMDs while an additional four or more connections may be provided on that console to provide and/or receive data from hand-held controllers. Video supplied to a HMD may, for example, be provided by the video game console as a result of reading and processing video game data on the video game console (e.g., from a removable storage medium including the video game).

In this manner, HMDs may be operable, for example, to just utilize one or more video signals, audio/video signals, or video/audio/control signals. In one video/audio/control embodiment, audio may be provided and utilized by the HMDs such that sound may be played to a user through speakers in the HMD. Video may then be played on one or more screens (e.g., non-transparent and/or transparent displays) on the HMDs. Control signals may them be sent such that, for example, the HDM can rumble at particular times (e.g., when a video game character associated to an HMD-wearing user gets shot, or punched, in the head). Similarly, an HMD may output one or more audio signals, video signals, control signals, or any combination of audio, video, and control signals. For example, an HDM may include one or more microphones such that, for example, a player can talk over an internet, or an intranet, connection to a competitor that is playing the same game at a different location. Such an HMD may also, for example, output readings from one or more inertial movement sensors (e.g., accelerometers and/or gyroscopes) or positioning receivers (e.g., global positioning system receivers). Such signals may be utilized to determine the movement, tilt, and position of an HMD.

A console may also be provided with battery recharging ports. For example, one or more controllers or HMDs may be wireless. Thus, a local power system may be desired to recharge the wireless controllers (e.g., unless wireless power transmission is utilized). Such a local power system may include one or more rechargeable batteries.

Thus, a user playing a video game may, for example, pause the game when a battery is LOW, remove the battery, and place the battery in a recharging port of a console. Similarly, the user may remove a second battery that has been recharged by the recharging port and place this recharged second battery into a device needing a battery (e.g., an HMD, controller, or any gaming device). A low battery indicator may displayed on the HMD, a controller, or on a video game (e.g., on a television display or an HMD display). The game may automatically be paused when, for example, a battery is LOW.

A video game console is provided that includes an augmented reality HMD. Such an augmented reality HMD may, for example, overlay video game indicia over a user's real, physical environment. A transparent display screen may be utilized in such an augmented reality HMD. An augmented reality HMD may be utilized as a virtual reality HMD, in which, for example, the HMD displays to a user a virtual environment in a manner that does not allow the user to see his/her actual, physical environment. A HMD with a non-transparent screen may, for example, provide virtual reality functionality and may also provide augmented reality functionality. For example, a non-transparent HMD may include a camera that captures a user's environment. The captured images may be processed and video game indicia may be added to the processed captured images. The processed captured images may then be displayed to a user through the HMD such that a user can see his/her physical, actual environment, as augmented by video game indicia.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 16 is a handheld video game constructed in accordance with the principles of the present invention;

FIG. 17 is a handheld video game constructed in accordance with the principles of the present invention;

FIG. 18 is a handheld video game in accordance with the principles of the present invention; and FIG. 19 a handheld video game constructed in accordance with the principles of the present invention.

DETAILED DESCRIPTION OF THE DRAWINGS

U.S. patent application Ser. No. 10/400,296, filed on Mar. 25, 2003, entitled "Systems and Methods for Locating Cellular Phones and Security Measures for the Same" is hereby incorporated by reference herein in its entirety.

U.S. patent application Ser. No. 10/932,536, filed on Sep. 1, 2004, entitled "Systems and Methods for Location Based Games and Employment of the Same on Location Enabled Devices" is hereby incorporated by reference herein in its entirety.

U.S. patent application Ser. No. 11/208,943, filed on Aug. 22, 2005, entitled "Wireless Devices with Flexible Monitors and Keyboards" is hereby incorporated by reference herein in its entirety.

U.S. patent application Ser. No. 11/281,812, filed on Nov. 11, 2005, entitled "Location-Based Games and Augmented Reality Systems" is hereby incorporated by reference herein in its entirety.

Figure 1:
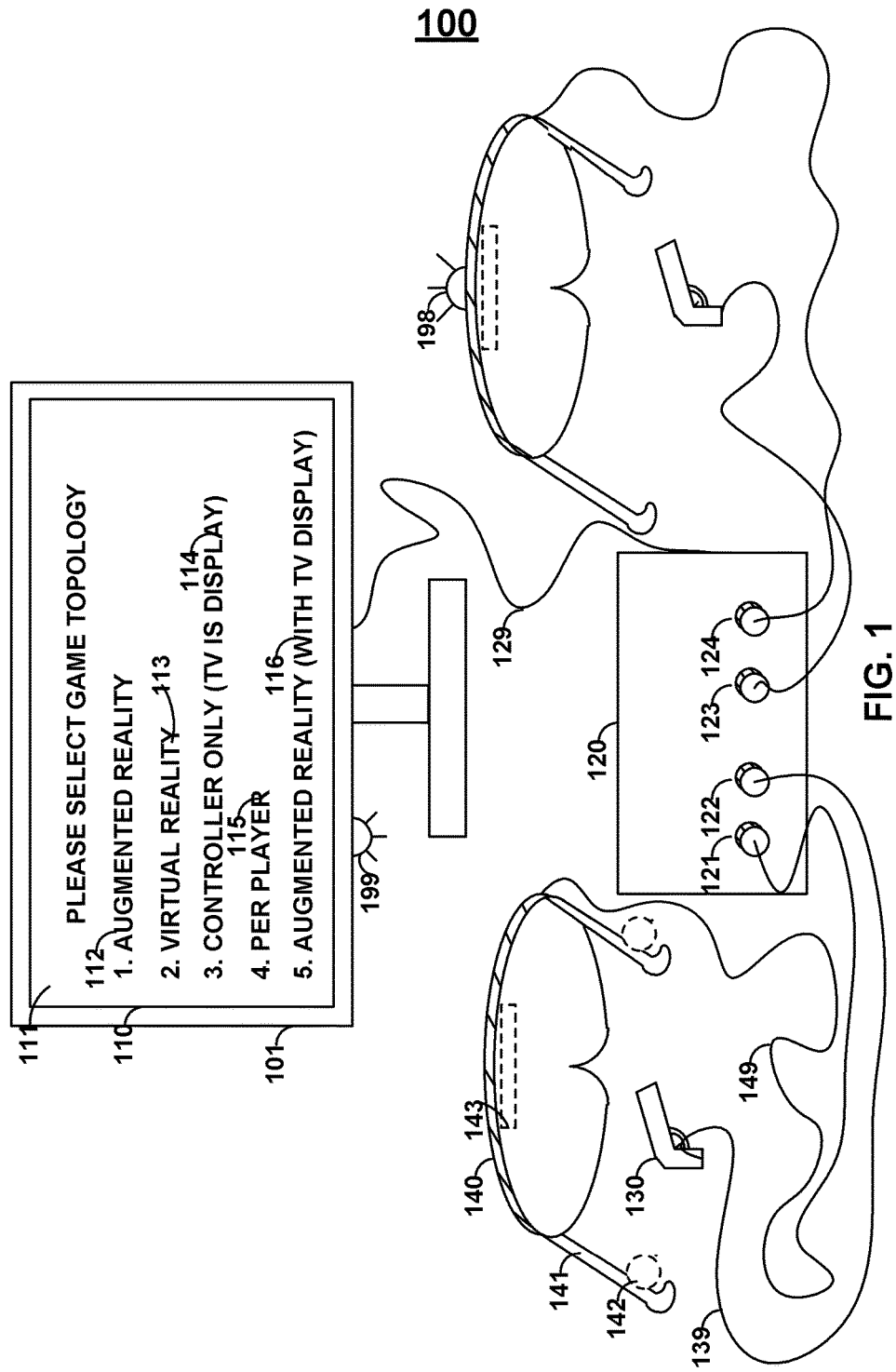
FIG. 1 is an illustration of a video game console that includes ports for connections with multiple head mounted displays constructed in accordance with the principles of the present invention.

FIG. 1 shows display 110 that may provide graphical user interface (GUI) 111. Display 110 may be included in device 101, which may be a stationary device (e.g., a television set) or a portable device (e.g., laptop, wireless telephone, or handheld gaming system).

Game system 120 may communicate with display 110 (e.g., provide information to display 110 by communicating with device 101) through a wire-based communication channel via wire-based link 129 or through a wireless communication channel. A wireless communications channel may be provided, for example, via wireless link 199 and a wireless link located on game system 120. As such, game system 120 and device 101 may include, for example, one or more wire-based or wireless-based ports to communicate information (e.g., display and audio information). For example, game system 120 may include one, two, three, four, or more wire-based ports that are operable to provide a wire-based link that provides audio and video to ports in device 101. Such ports may be, for example, coaxial ports, component video ports, audio/video ports, and/or any other type of audio and/or video port (e.g., a High Definition Multimedia Interface (HDMI) port). In this manner, system 120 may provide video and audio to numerous television sets. In doing so, a single video game system may provide audio/video information to multiple television sets so that each player view the video game on her/her own television set. Furthering the example, each player may be provided with different video game indicia provided by a video game on the player's designated TV set. In doing so, for example, four players that play a first-person perspective game may view only his/her first-person perspective on a video game and not his/her opponent's first person perspectives.

Game system 120 may include any number of additional communication ports that may be, for example, wireless or wire-based. For example, game system 120 may include controller ports 122 and 124 and HMD ports 121 and 123. Such a game system may provide two pairs of HMD and controller ports. A game system may include any number of HMD and controller ports (e.g., one, two, three, four, or more such port pairs). The controller and HMD ports may be located on one face of game system 120 (e.g., a front face), while television ports are located on an opposite face (e.g., the rear face). A game media-receiving device (e.g., a disc drive) may be located on game system 120. For example, a game media-receiving device may be located on the top, front, or side face of game system 120. A game media-receiving disc drive may be top loading or side loading (with respect to the disc). Disc-based media-receiving devices may include, for example, CD, DVD, Blue-Ray, and/or HD-DVD readers. Other types of game media-receiving devices may include, for example, flash readers or any type of memory cartridge. One or more permanent or removable hard drives may be provided to store game-related information.

Persons skilled in the art will appreciate that a single port may provide the functionality of a HMD port, a controller port, and/or a HMD and controller port. For example, a port located on a game system, or any device, may include wire connections for a controller in which only control signals are received by the game system from the game controller and also wire connections for a HMD in which both control signals and audio signals (e.g., microphone) signals are received by the game system from the HMD. Such a port may also receive other types of information (e.g., image information) from a device (e.g., a camera included in an HMD). Such a port on a game system, or any device, may send information such as mechanical information to a controller (e.g., a "rumble" control signal), control information to a controller (e.g., how to configure the controller to operate), sound information to a controller, visual information to a controller, mechanical information to a HMD, control information to a HMD (e.g., to switch between an augmented reality and virtual reality topology), visual information to a HMD, and audio information to an HMD. A port may, for example, be operable to detect which wire connections are made when a wire-based link is inserted into the system such that the game system can autonomously recognize the type of signals it has to provide and receive from a device. Similarly, the device may load, when connected, software for operating the device through the control port. As per another example, the device can send an identification number to the game system such that the game system can identify the type of device that was inserted into the port of the game system. Persons skilled in the art will appreciate that any port may include one or more wire-based links for one or more devices that are operable to receive (from the game system) sound, video, operational power, and/or additional signals (e.g., control signals to make the HMD or controller rumble or software updates to configure/change the software in a device) as well as transmit (to the game system) sound, video, control signals and/or additional signals (e.g., status information such as the status of a battery internal to a HMD). Persons skilled in the art will appreciate that such a wire-based port may be provided as a wireless port that may provide any type of signal wirelessly (e.g., power, visual gaming information, audio, and/or control data).

Port 122 may, for example, be operable to receive a particular type of wire-based communication stream from controller 130 (and/or a HMD). Port 121 may, for example, be operable to receive a particular type of wire-based communication stream from HMD 140 (and/or a controller). HMD 140 may be, for example, a virtual reality headset and/or an augmented reality headset. HMD 140 may include positioning and/or inertial movement sensors 143 to determine, for example, the position of HMD 140 (e.g., the location of HDM in the world using positioning signals such as from a global positioning system (GPS)). HMD 140 may include (e.g., in addition to one or more GPS receivers) one or more inertial sensors (e.g., accelerometers and/or gyroscopes) to determine the direction that HMD 140 is facing, moves, and the amount of movement (e.g., the velocity and acceleration of the movement). HMD 140 may include structures 141 that may be utilized to secure a display in front of a person's eyes. Structure 141 may be, for example, structures similar to glasses for grasping behind a person's ear or a belt or strap. One or more additional devices 142 may be included on such structures such as, for example, microphones, speakers, or mechanical movement devices (e.g., rumble devices). Port 123 may couple to a controller (and/or HMD). Port 124 may be coupled to a HMD (and/or a controller).

A HMD may also include wireless communication devices such as, for example, wireless communication device 198. Game system 120 may also include wireless communication devices to communicate to any number of controllers, HMDs, and/or stationary devices 101 (e.g., through wireless communication device 199). Similarly, a wireless communications device, such as device 199 and 198, may communicate with remote devices such as remote databases. Game system 120 may also include one or more wireless communications devices to communicate with a controller, HMD, other stationary devices 101 or a remote device such as a remote database.

Game system 120 may be included in, for example, stationary device 101 or an HMD. Persons skilled in the art will appreciate that HMDs may include one or more non-transparent display screens that a user may not see through (e.g., which may provide a virtual reality display) or a transparent display screen that is operable of displaying virtual images to provide a virtual reality video game. Images may be provided on a transparent display screen such that the user can still see his/her environment through the transparent display screen as augmented by the images. As such, a transparent display screen may provide an augmented reality video game. Similarly, a camera may be provided on a HMD and a non-transparent display screen may provide a game in which a user's environment is modified by video game indicia. For example, a video game character may be overlayed on a user's environment, as captured by the camera, and this modified environment may be displayed to a user.

Persons skilled in the art will also appreciate that a screen that a user can see through and that is capable of displaying virtual indicia may be utilized as a virtual reality screen by displaying virtual indicia, that a user cannot see through, across the entire display screen.

A user, for example, may never be able to see through a non-transparent screen when the non-transparent display is ON or OFF, yet a user may be able to see through a transparent display screen while at least the transparent display is OFF. If a transparent screen is partially provided with video game indicia, an augmented reality video game may be provided (e.g., a user's environment may be modified by video game indicia), yet if the entire transparent screen displays a video game then a virtual reality video game may be provided. A user's environment may be modified by video game indicia by, for example, introducing a video game character into the user's environment.

Display 110 on device 101 (or a display on an HMD) may receive and display a GUI from game system 120 Accordingly, for example, game system 120 may read game code from a programmable medium (e.g., a DVD, blue-ray disk, flash memory, HD DVD) inserted into the game system and use the game code to provide signals representative of the GUI that display 110 can understand. Such signals may be, for example, signals that device 101 can understand and translate into information that display 110 can understand. Such a GUI may be, for example, the selection of the type of way the game should be displayed. For example, a game console operable of using HMDs may provide a display where a user can select augmented reality mode 112 (e.g., for all player's HMDs), virtual reality mode 113 (e.g., for all player's HMDs), controller only mode 114 (e.g., TV is a display and no indicia are provided to a HMD), a different display mode per player mode 115 (e.g., player 1 uses the television and player 2 uses an HMD in a virtual reality configuration), and/or an augmented reality with TV mode 116 (e.g., images are provided on the television and augmented reality indicia can interact with such images).

An HMD and/or video game controller may also be oriented with respect a device. Such a device may be placed around device 101 (e.g., played on top of device 101) such that the an HMD and/or video game controller can be oriented with respect to device 101. Such an orientation may, for example, be located about device 101 (e.g., placed on top of device 101). Such a device may, for example, transmit signals such that an HMD and/or a controller may determine whether the HMD and/or controller is facing the orientation device and the degree to which the controller and/or HMD is facing the device. For example, a device may include multiple structures that emit signals that can be distinguished (e.g., different IR, or microwave, signals). The HMD and/or controller may determine which of the IR, or microwave, signals it is receiving and may utilize these signals to determine that the HMD and/or controller is facing the device and that the HMD and/or controller is facing a particular part of the device (e.g., the left side of the device with respect to the user). Alternatively, for example, the device may include structures that transmit the same signal (e.g., the same IR signal) and an HMD and/or controller may utilize these signals to determine whether the controller is facing the device and to what degree the controller is facing the device (e.g., how strong the received IR signals are). Persons skilled in the art will appreciate that the strongest signal may be received, for example, when the HMD or controller faces the middle of the device.

The structures may be angled such that the signals provided by the structures hit the ground in different locations. In doing so, a HMD and/or controller may receive signals and determine if the HMD or controller is moving away from, or towards, the device by determining that the HMD and/or controller has picked up different signals from differently angled structures.

A HMD may include one or more inertial and/or positioning sensors to determine the direction that a user is facing. The HMD may utilize such sensors to determine information such as the pitch, tilt, and roll of the HMD as well as the velocity and acceleration of any movement. Persons skilled in the art will appreciate that inertial sensors may be utilized to determine the position of a device. For example, one or more accelerometers and/or gyroscopes may be utilized to determine the position of a device. For example, acceleration information may be obtained from an accelerometer. The integral of acceleration information may provide velocity information. The integral of velocity information may provide positional information. Any processing may occur on any device (e.g., an HMD, controller, and/or game system).

Information obtained from, for example, positioning and/or inertial sensors may be transmitted to a game console such that the game console can provide visual information dependent upon the direction that a user is facing. Accordingly, for example, the pitch, tilt, and roll of an HMD (and/or controller) as well as the velocity and acceleration of any movement may be utilized in determining which visual information should be displayed to a user (e.g., which information should be displayed on an HMD).

An HDM may also include positioning sensors to determine where the HDM is located. Global Positioning Sensors (GPS) may be utilized to determine, for example, the a device's location in the world and/or the users position with respect to a position reference. Local Positioning Sensors may be utilized to determine, for example, a device's location in a playfield and/or the device's position with respect to a position reference. Such positioning information (as well as inertial movement information) may be utilized in any device such as a game system (e.g., handheld game system), HMD, and/or controller. Multiple video game systems may be utilized to provide a video game such as a multiplayer video game.

Furthermore, a positioning system may be utilized to periodically provide position information for an HMD while inertial sensors can be utilized to update this position between updates from the position system. For example, a GPS system may be utilized to periodically determine the location of a device, such as an HMD, and one or more accelerometers and/or gyroscopes may utilize inertial movement information such as acceleration to determine how the device moves, and the device's position changes, between GPS updates.

HMD's may include memory to store the visual video game information received from the game console and may, for example, further process the visual information such that the visual information can be displayed on a particular HMD. Persons skilled in the art will appreciate that the game system can receive identification information from the HMD such that the game system can perform any such additional processing (e.g., for a particular brand and/or version and/or type of an HMD).

Figure 2:
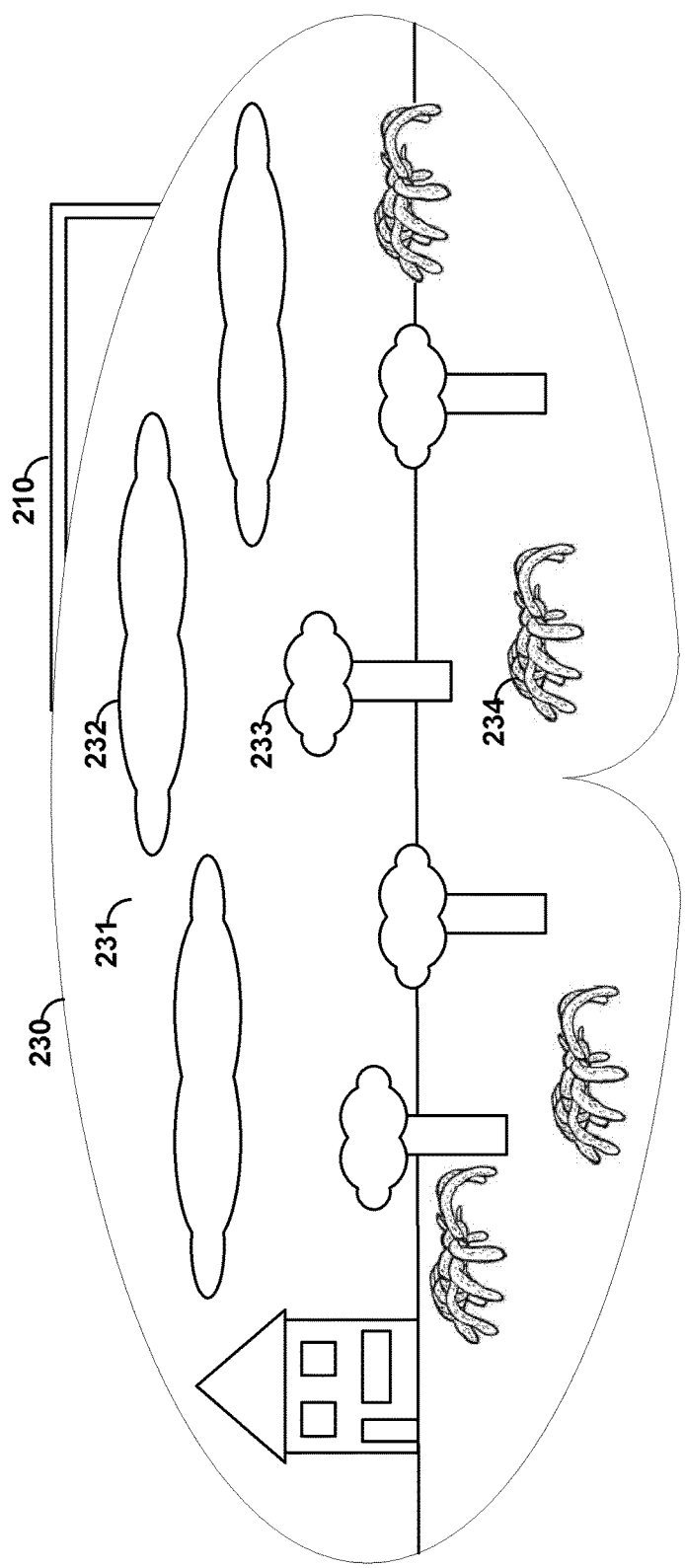
FIG. 2 is an illustration of a virtual reality display constructed in accordance with the principles of the present invention.

FIG. 2 shows topology 200 that may include display 230, which may be included in a HMD. Stationary television 210 is positioned in front of display 230 in FIG. 2. Display 230 may be a a non-transparent display screen such that a virtual reality game may be provide on the non-transparent screen. As such, for example, a user may not see through the non-transparent display screen when the display screen is ON or OFF. Such a display screen may receive visual information from the game console (e.g., either wirelessly or through a wire). Such visual information may be utilized to display, for example, a virtual sky 231, clouds 232, trees 233, virtual characters 234, and any other type of virtual object. As such, a game console may provide an HMD with a virtual world that a user can interact with. A user may utilize a controller to walk through the environment where if a user turns his/her head to the left, the portion of the virtual environment shown to a user scrolls out to the right such that a new portion of a virtual environment scrolls in from the left. A user may press a button on a controller to move throughout the game in the direction the user is facing. Alternatively, movement through a video game may be controlled by one or more positioning and/or inertial movement devices. Persons skilled in the art will appreciate that a transparent screen may be utilized to emulate a virtual reality display by displaying non-transparent virtual indicia across the entire transparent display such that the transparent display essentially becomes non-transparent. Due to the non-transparency of display 230, television 210 can not be seen when looking through display 230.

Figure 3:
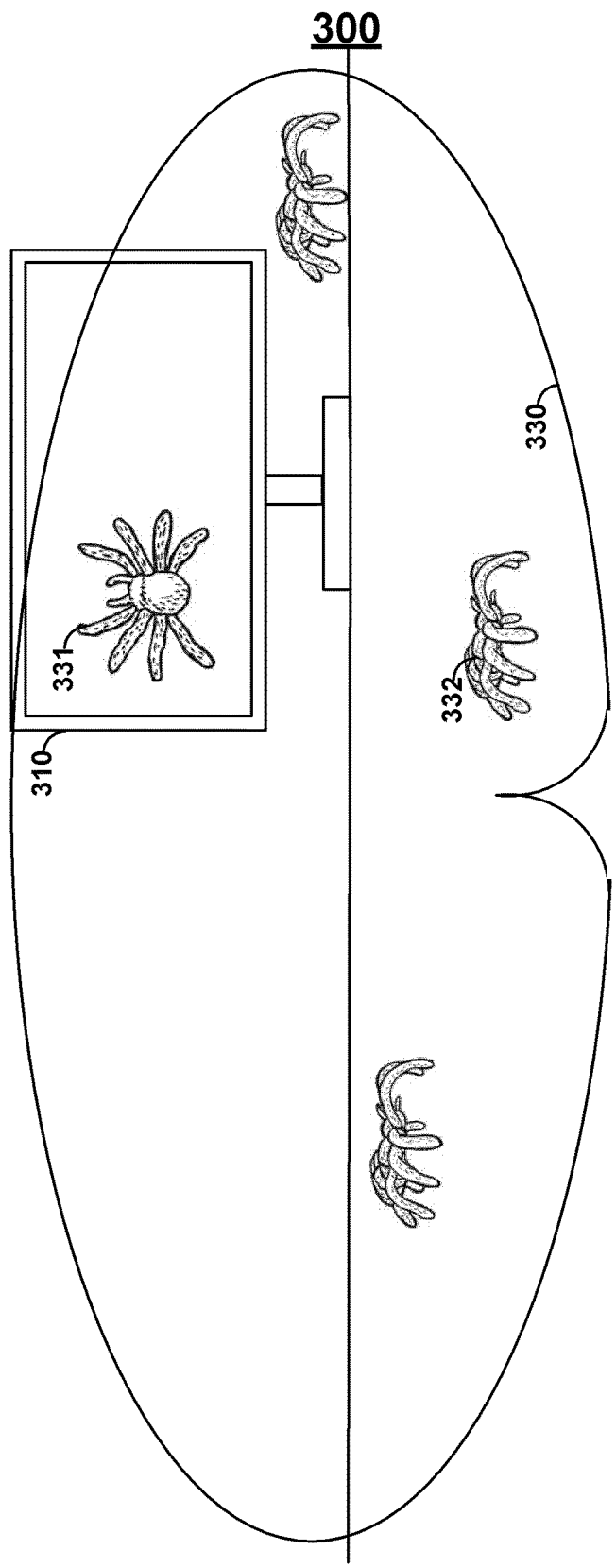
FIG. 3 is an illustration of an augmented reality display constructed in accordance with the principles of the present invention.

FIG. 3 shows a transparent display screen positioned in front of television 310 in topology 300. As the display screen is transparent, a user looking through the display can see television 310. Transparent screen may be provided with virtual images 331 and 332 (which may be provided from a game console) over a user's physical environment.

Persons skilled in the art will appreciate that by displaying images on a transparent display screen, the display screen may become semi-transparent. A virtual reality game may be provided if a virtual reality screen fills the entire transparent display. GUI's for initiating the start or features of an augmented and/or virtual reality games may cover the entire screen.

Virtual objects may be, for example, virtual characters that move around. A HMD may include a landscape detector that can determine its surroundings. As such, the HMD may position virtual objects over a user's surroundings and have the virtual objects interact with a user's physical environment. For example, a virtual spider may crawl across a user's floor and then climb up a user's television and/or wall. Information from the landscape detector may be provided to a video game to assist in orienting a video game character. Similarly, information from positioning and/or inertial movement sensors from video game devices (e.g., HMDs, handheld game systems, and/or controllers) may be utilized to orient characters. For example, a device may be placed on top of a television that sends signals and different angles on the user's floor. Thus, the device may determine the location and landscape of the portion of a user's floor that is located in front of the television. Accordingly, this device may transmit such landscape information to a video game system such that the video game system can place virtual objects on an HMD. A video game system may then, for example, utilize a device on a HMD to determine if the HMD is facing the television (e.g., as the device on the television may provide signals, such as IR signals, to the HMD so the HMD can determine orientation information and send this orientation information to the game system) and can detect the landscape of the floor in front of the television. The game system can then determine how the landscape determined by the television device and the HMD device overlap such that appropriate video game indicia may be provided to the HMD. The tilt, pitch, and roll of the HMD may also be utilized in determining how such objects, or any visual information, is displayed. Similarly, an HMD and/or controller may, for example, provide information that is received by the video game console and/or a device located about a television such that this information may be utilized by the video game system to determine the location and presentation (e.g., rotation) of images on an HMD for a particular moment in time. A landscape detector may take many forms. For example, a landscape detector may be a camera and images taken from the camera may be utilized to determine the landscape a user is confronted with.

Persons skilled in the art will appreciate that an HMD may be provided by a game console with information about a particular game level or a portion of a game. HMD may then process this information and utilize control signals (e.g., the way the HMD moves, controls received from a controller) and process such control signals to appropriately display particular visual information in a particular location. Such processing may also occur, for example, at a video game system. Persons skilled in the art will appreciate that an HMD may be a video game system in and upon itself such that a portable gaming system may be realized by the HMD. Any number of controllers may be coupled to such a HMD, or any HMD or game system, to provide controls for controlling the video game.

Figure 4:
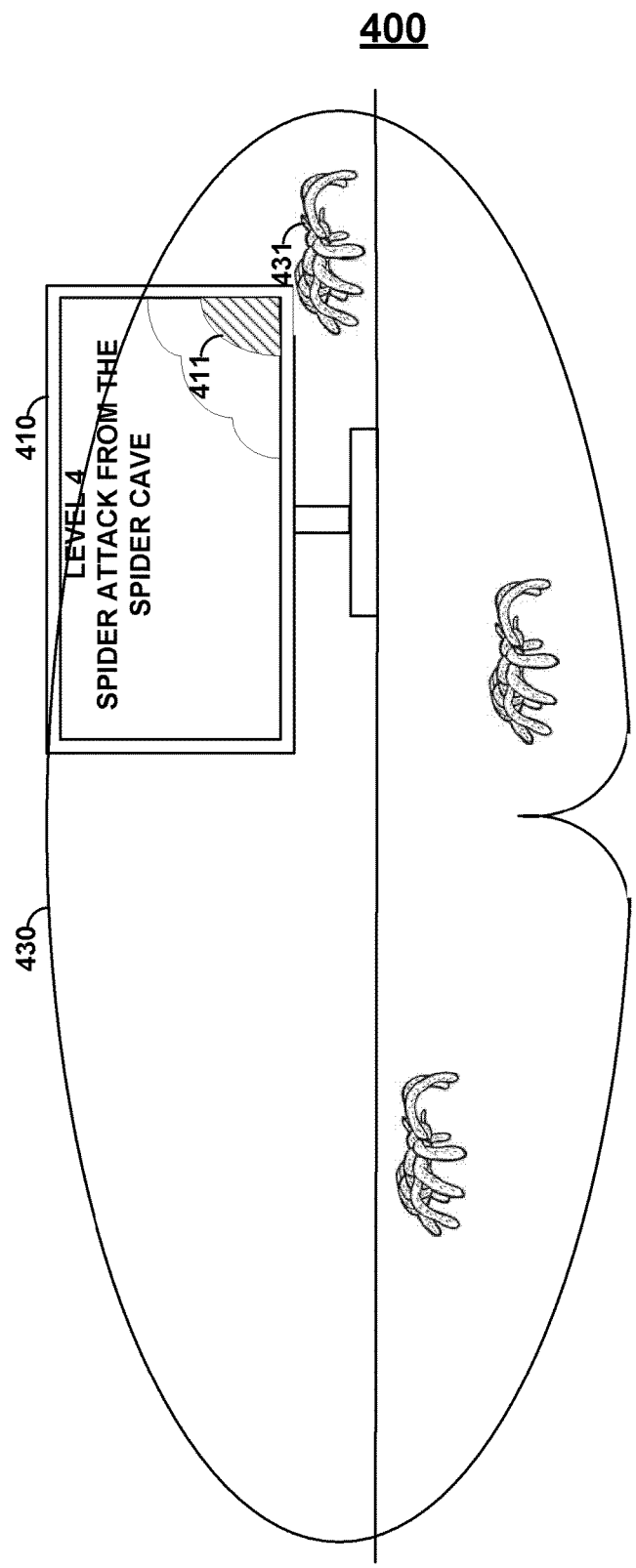
FIG. 4 is an illustration of an augmented reality display that is utilized with a stationary display, such as a home television, constructed in accordance with the principles of the present invention.

FIG. 4 shows display 430 that is located in front of television 410 in topology 400. As display 430 is a transparent display, a user looking through display 430 may be able to see television 410. Display 430 is operable to provide virtual indicia (e.g., virtual character 431) to a user such that a user's physical environment is augmented with virtual gaming indicia.

Persons skilled in the art will appreciate that since a game console may provide display information to both display 430 and stationary television 410, the game console can coordinate such display information. For example, the game console can provide a video game by providing display information to an HMD display and a stationary display. For example, a game console can provide particular visual information to television 410 such that an environment is displayed on the television. A user's HMD can then provide virtual indicia to interact with the environment displayed on stationary display 410. For example, a HMD may provide virtual spiders and a spider cave can be displayed on stationary display 410. As such, the spiders displayed on the HMD may be displayed as coming out of the cave when the spiders are first displayed to a user on an HMD.

Persons skilled in the art will appreciate that a HMD may include a number of light sensors to detect the light coming from the television such that the television can be located. Similarly, the game console may know the type of visual information that was provided to the television display and can use the sensors on the HMD to pick up this information. As such, the game console can determine the different portions of the stationary display by providing different visual information to the different portions and detecting where the different visual information was sensed by the HMD. For example, the console may provide different colors (or amounts of light or types of light) to different portions and move these colors and the HMD can then detect the colors and send the color location information to the console. If the movements of the two match, then the console may assume that the user is looking at a particular portion of stationary display 410. A game console can use such information to change the virtual information on the HMD or stationary display 410. Alternatively, one or more devices may be placed about (e.g., on top of or underneath) that may be utilized to provide the game console with information that would allow the console to orient a HMD or controller with the device. For example, the device may transmit signals, a HMD or controller may receive the signals and the HMD, controller, and/or video game system may utilize the received information to determine the orientation of the HDM and/or contoller with respect to the device (e.g., whether, and to what extent, a controller is facing the stationary display). Persons skilled in the art will appreciate that multiple controllers and multiple HMDs may utilize the same device located about the stationary display to assist in orienting the HMDs and/or controllers with the device (e.g., with the TV about which the device is located).

Figure 5:
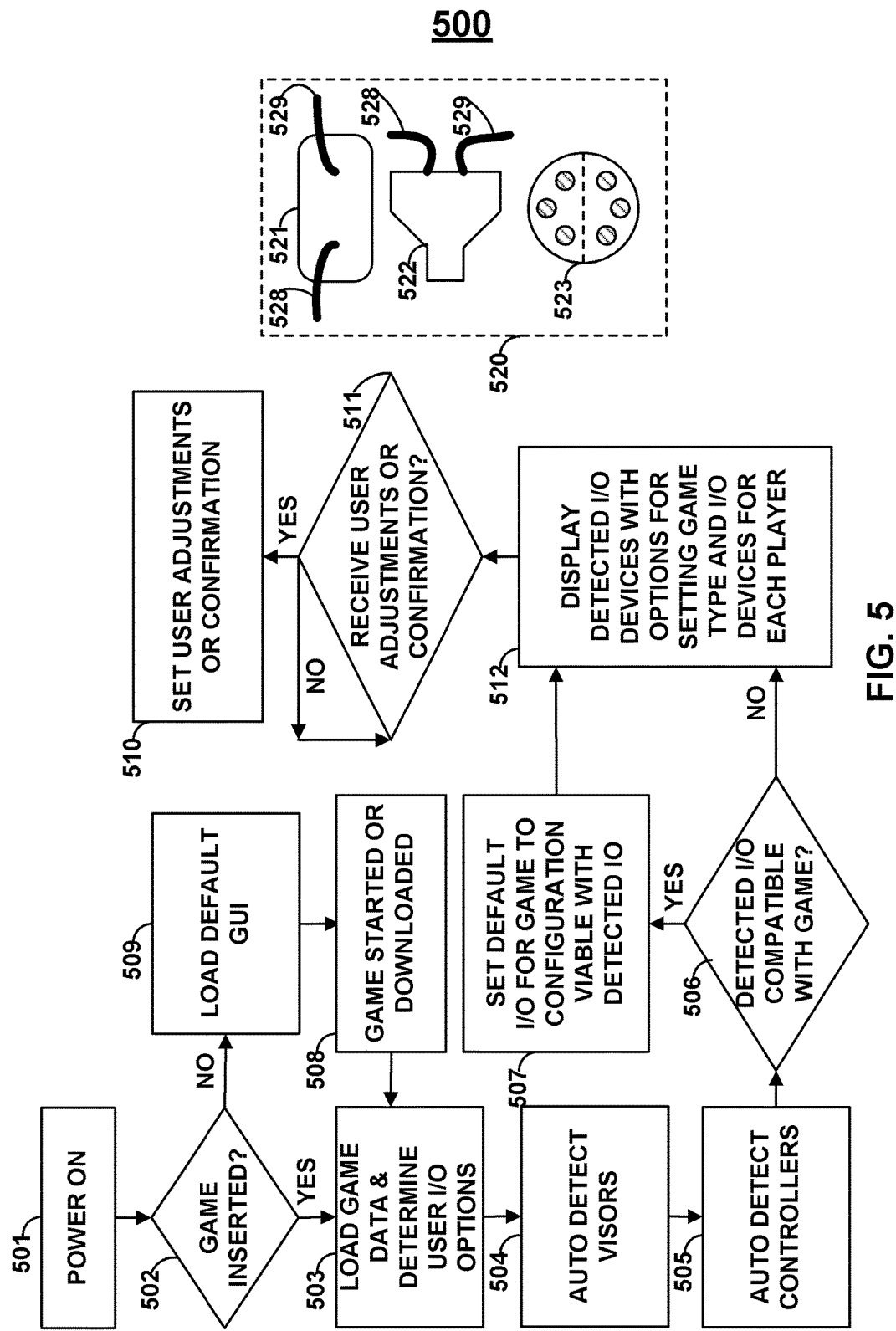
FIG. 5 is an illustration of connection cables and a flow chart of a video game process constructed in accordance with the principles of the present invention.

FIG. 5 shows a flow chart and wire-based communication link 520. The flow chart may begin when, for example, a game system is turned ON in step 501. Step 502 may be utilized to determine whether or not a game is inserted into the game system. Step 503 may be utilized to load game data if a game is inserted in step 502. Step 503 may also, for example, determine user input/output options (e.g., the types of devices that are communicating with the game system). Step 504 may be utilized to automatically detect if visors (e.g., HMDs) are in communication with the game system (e.g., coupled via wire-based links or communicating wirelessly). Step 505 may be utilized to auto-detect controllers. If a game is not inserted, for example, a default GUI may be displayed in step 509 (e.g., a GUI that displays system information—not game information) until a game is inserted or downloaded and initiated in step 508. Step 506 may be utilized to determine whether or not the devices coupled to the game system are operable with the game system. Step 506 may receive, for example, identification information and may communicate with a remote server to identify the identification information if the game system does not know the identity of the identification information. Similarly, a game system may update the software on the game system such that the game system is compatible with the component. Similarly, the component (e.g., HMD) may include a software update for the game system and may include identification of this software update to the game system such that the game system can determine whether or not the software update is needed (e.g., installed). If the software update is needed, then the game system can, for example, download the software update from the component (e.g., from the controller and/or HMD). Step 507 may be utilized to set default input/output configurations for a game to configurations viable with the detected input/output devices (e.g., channels). Step 512 may be utilized to display the detected input/output devices with options for setting game type and input/output devices for each player. Step 511 may be utilized to receive user adjustments and/or confirmations. Step 510 may then set user adjustments and/or confirmations.

Persons skilled in the art will appreciate that any type of wire-based link may be utilized to communicate with a game system. For example, a wire-based link that includes communication wires for both a HMD and a controller may be utilized such as wire-based link 520. Such a wire-based link 520 may be utilized such that a game system can determine whether a controller, HMD, or a controller and HMD are coupled to a port that received wire-based link 520. Particularly, wire-based link 520 may include a structure 521 that provides two communication wires 528 and 529. Communication wires 528 and 529 may each include a bundle of wires. Communication wires 528 and 529 may be coupled to separate control devices (e.g., two separate controllers or a controller and HDM). Communication wires 528 and 529 may be combined into a single bundle at the other end of structure 522 (e.g., end 523). End 423 may then provide the wires included in wires 528 and 529 in a particular configuration. For example, the top wires (e.g., the top 3 wires) may be controller wires, while the bottom wires (e.g., the bottom 3 wires) may be HMD wires. A game system can then detect whether a controller or HDM or both are connected to the game system by determining which wires are provided (e.g., which wires electrically couple with corresponding wires on a game system port). Thus, if only a controller is coupled to a port, then structure 522 may only include wire 528 and, as such, only wires corresponding to a controller may be provided at end 523 (e.g., no HMD wires may be provided).

Figure 6:
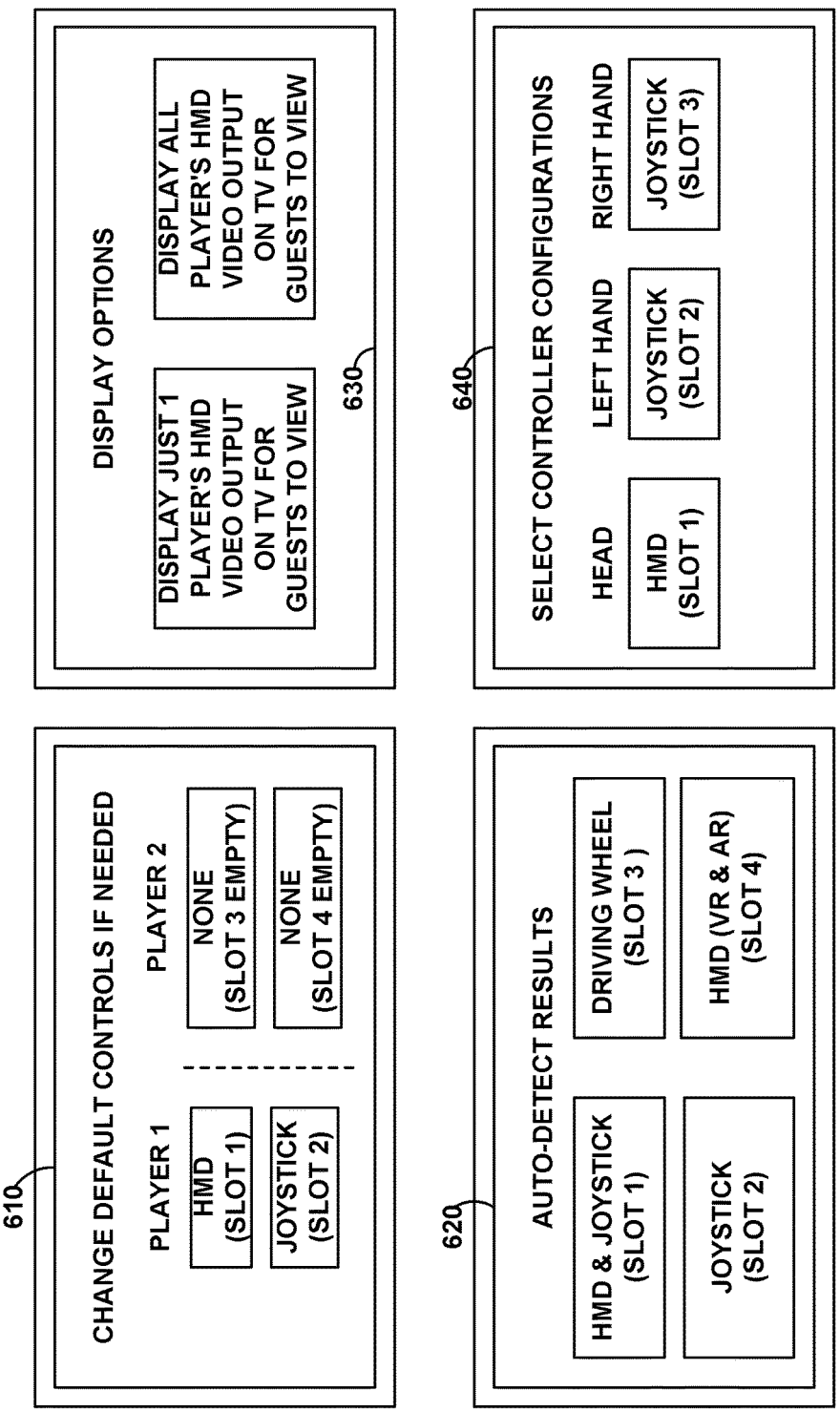
FIG. 6 are illustrations of display screens constructed in accordance with the principles of the present invention.

FIG. 6 shows GUIs 600 that may be utilized in a video game system. GUI 610 may include a GUI that provides the default control scheme determined or provided by the video game system. For example, a game system may detect that a controller and a HMD is coupled to the game system and may autonomously associate the controller and the HMD to the game to the controls for a single player. GUI 610 may then allow a user to modify these control schemes such that, for example, the HMD may be changed from being associated to a first player to being associated to a second player (e.g., in a game where one player is the "eyes" of the team and the other player provides "controls" for the team). GUI 610 may then detect if new devices are coupled to the game system (e.g., an additional controller or HMD) and then may autonomously associate these new devices to a player, display these choices to the players, and then allow the players to adjust the autonomously determined control schemes.

GUI 630 may be utilized to set up display options. For example, one or more players may be able to change the display options from displaying all of the players HMD video output on a display screen for guests to view (e.g., by providing a split screen on the TV) or to display a particular HMD video output on the TV for guests to view.

GUI 620 may be utilized to automatically detect the type of device (or devices) coupled to each input/output slot. Players may be able to, for example, use GUI 620 to chose a particular configuration for a particular controller or HMD (e.g., instruct a game system to provide VR or AR visual information to an HMD operable of providing both AR and VR).

GUI 640 may be utilized to associate particular devices to a particular type of controller that may be utilized by a particular game. For example, a player may designate one controller (e.g., the controller in slot 2) as being associated with his/her left hand and another controller (e.g., the controller in slot 3) as being associated with his/her right hand. The player may also designate a particular HMD (e.g., the HMD in slot 1) as being associated with his/her head.

Figure 7:
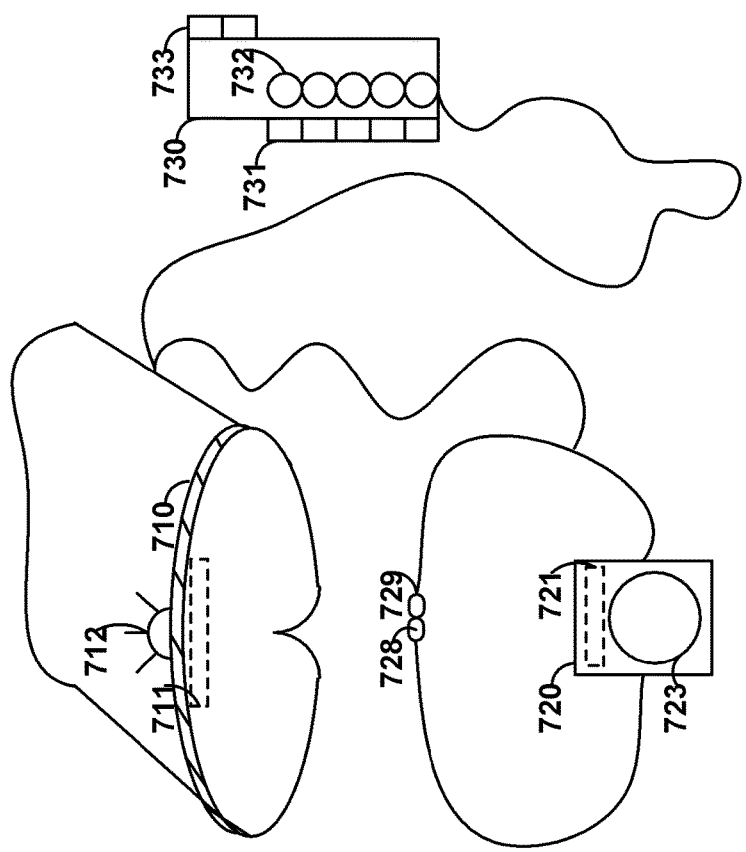
FIG. 7 is a game display, additional device, and controller constructed in accordance with the principles of the present invention.
Figure 8:
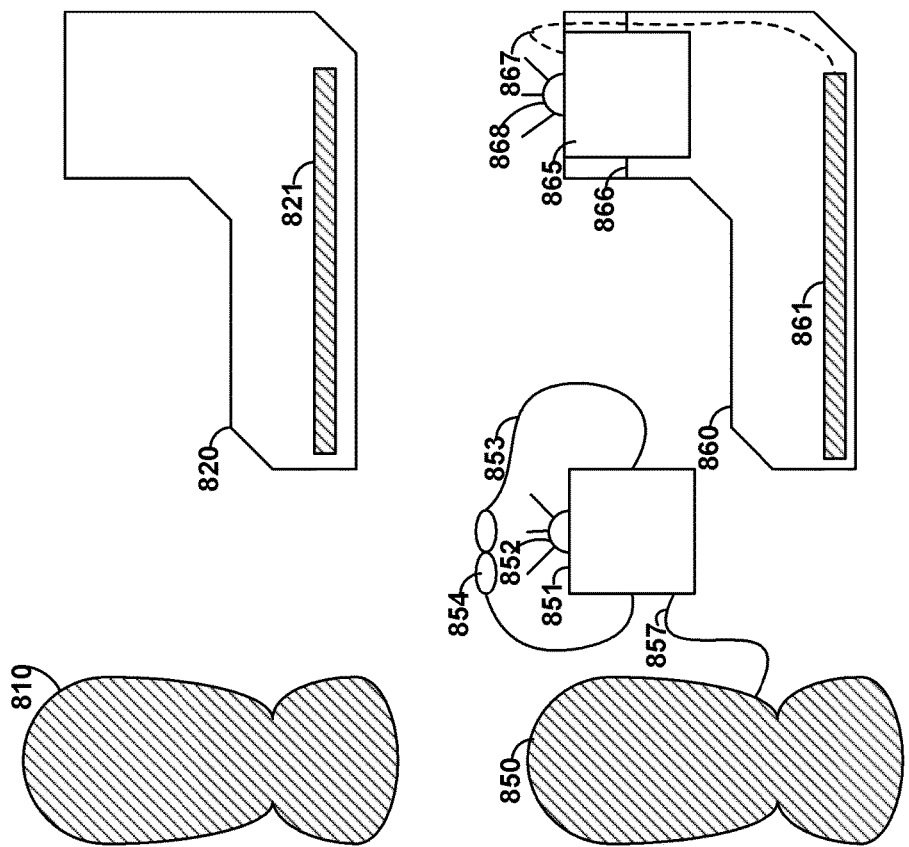
FIG. 8 are foot controllers constructed in accordance with the principles of the present invention.

FIG. 7 shows portable system 700 that may include HMD 710 (which may include wireless communications device 712 and inertial/positioning sensors 711) coupled to a portable system 720 that may include, for example, inertial/positioning sensors 721 and media input device 723 (e.g., a HD DVD or DVD player). Portable game system 720 may be attached to a user via attachments 728 and 729. Attachments 728 and 729 me used, for example, to attach game system 720 around a user's neck such that game system 720 rests across a user's chest or back. Such a configuration reduces the wires around a user's body such that when a user swings controller 730, the changes that a user's arms gets caught in wires coupling HMD 710 to game system 720 is reduced. Controller 730 may include any number of buttons 731, 732, and 733. For example, buttons 733 may be reachable by a user's thumb. A user's palm may grip controller 730 under buttons 733. A user's other fingers (and possible a user's thumb) may then be in position to easily interact with buttons 731 and 732.

Controller 730, HMD 710, and game system 720 may communicate wirelessly (e.g., through wireless communication devices). Controller 730, HMD 710 and game system 720 may communicate with other devices (e.g., either wirelessly or via wires) such as other game systems (e.g., for multiplayer functionality) controllers or HMDs (e.g., if more than one player is using a single game system). Game system 720 may also be placed around a playfield such that one or more HMDs and controllers can wirelessly communicate with game device 720. Game device 720 may, for example, be powered by one or more batteries (e.g., removable rechargeable batteries). Game system 720, controller 730, and HMD 710 may include any number of positioning and/or inertial movement determination systems.

FIG. 7 shows shoe 820 that may include control pad 810. Control pad 810 may sense when a user presses down on control pad 810 such that controls are provided to a game system. Such information could be utilized, for example, to synch the running style of a player's character in a virtual world such that other players can be provided with a virtual character that is more closely matching the movements of the actual player controlling the character. Portable game device 851 may be provided that may be able to couple around a user's shoe. Control pad 810 (or control pad 850 may be placed in a user's she). Device 851 may not include game medium and run a game but may, for example, include inertial movement and/or positioning sensors and may wirelessly communicate controls and movement/position information to another device (e.g., game device 720 of FIG. 7) through wireless communication device 852. Device 851 may be attached to a user via attachments 854 and 853 and may communicate with pad 850 through wire(s) 857.

Pad 861 may be placed in a user's shoe and coupled to device 865 via wire 867. Device 865 may be secured to a shoe by straps 866. Device 865 may communicate through wireless communications device 868.

Figure 9:
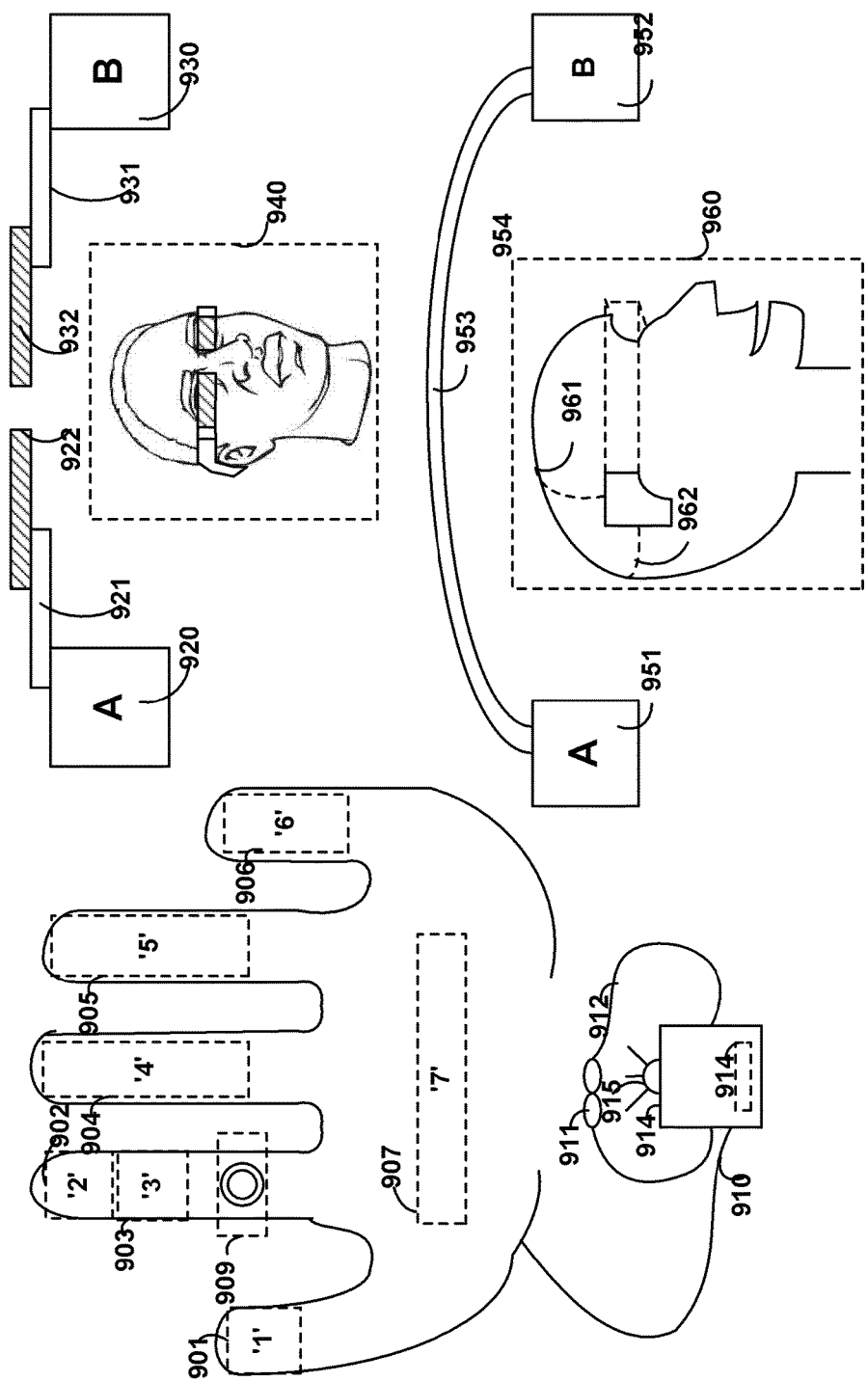
FIG. 9 are controllers and head mounted displays constructed in accordance with the principles of the present invention.

FIG. 9 shows a number of additional devices such as a control glove coupled to device 914 (e.g., a portable game system and/or a device having any number of inertial movement and/or positioning devices). Device 914 may include any number of inertial movement/positioning devices 914 and wireless communications device 916 and attachments 911 and 912. A control glove may include any number of control regions 901-907 that, when physically connected or within a particular distance of one another, produce a control signal indicative of the control regions that were touched. Regions may, for example, have one or more capacitance sensors and power may be provided to the regions such that the regions have a particular capacitance. The capacitance sensors can then sense the amount of capacitance when the sensors come into contact with another region to determine the regions that are within a particular distance or physically touching. Alternatively, a particular amount of voltage may be provided to a region such that other regions can sense this particular amount of voltage when the regions are physically coupled together or are brought within a particular proximity of one another. Alternatively still, a region may be a SENSE region that senses an electrical characteristic from a POWER region (e.g., region 910) while another region may be a POWER region that provides an electrical characteristic that the SENSE region can determine (e.g., regions 902-907). Mechanical control 909 may also be provided that may include, for example, a rotational ball that may be rolled to provide particular control signals and pressed to provide additional control signals. A control signal may be provided by a glove, for example, when region 901 touches, or comes into the proximity of, region 902. A different control signal may be provided from a glove, for example, when region 901 touches, or comes into the proximity of, region 903.

A HMD may be provided as a compact HMD such as individual devices 920 and 930 with a retractable display portion 922 and 932 that are coupled to extendable portions 921 and 931, respectively to provide HMD configuration 940. An additional structure may be provided to mechanically coupled displays 922 and 932 together to provide stability (e.g., provide the type of forehead stability that a pair of glasses may provide).

HMD configuration 960 may also be provided in which devices 951 and 952 house a flexible display 953. An additional strap 961 may be provided to provide support for the HMD from the top of a person's head. Additional strap 962 may be provided to provide, for example, support from the back of a user's head. Devices 951 and 952 may be shaped to grip behind a user's ear such that additional support is provided.

Figure 10:
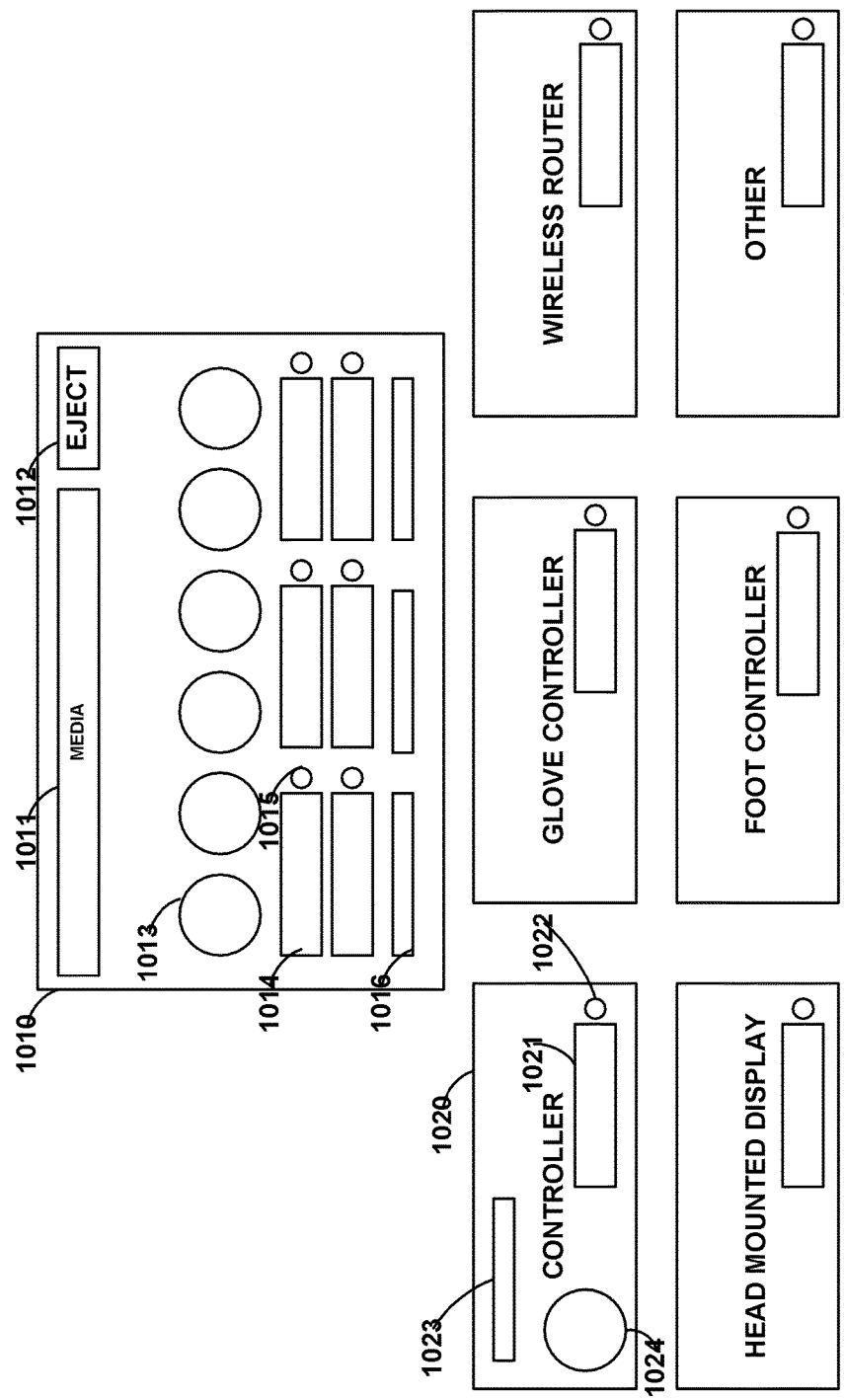
FIG. 10 is a video game console with rechargeable battery ports constructed in accordance with the principles of the present invention.

FIG. 10 shows game system 1010 that may include, for example, media player 1011 associated with eject button 1012, input/output ports 1013 that may be used, for example, to coupled HMDs and/or controllers. Game system 1010 may also include memory slots 1016 that may receive memory (e.g., compact flash) and read information from, and/or write information to, received memory (e.g., a player's profile and/or particular game information such as the player's progress in a particular game). Game system 1010 may also include battery slots 1014 that may, for example, receive a rechargeable battery and recharge the rechargeable battery if, for example, the battery is not already fully charged. Thus, a user may use, for example, a battery powered wireless HMD and a battery powered wireless controller and, when a particular battery needs recharging, a user can simply take out a charged battery in a rechargeable slot, put the battery that needs charging into the rechargeable slot, and then use the charged battery to power the device needing a charged battery. Power indicators 1015 may be provided that are representative of the amount of charging that has occurred. For example, power indicators 1015 may be YELLOW when the battery is charging and GREEN when the battery is fully charged. Alternatively, power indicators 1015 may be RED when the battery has LOW power, YELLOW when the battery has MEDIUM power, and GREEN when the battery has HIGH power. Thus, a user may be able to select the most charged battery when a new battery is needed. Alternatively, power indicators 1015 may include a percentage number that is indicative of the percentage that the battery is charged. Persons skilled in the art will appreciate that different types of batteries may store different amounts of energy. Thus, power indicators 1015 may include the amount of time that a battery is expected to operate in a particular device (e.g., a controller). Persons skilled in the art will also appreciate that different devices may consume power at a faster rate than other devices. As such, different batteries may be utilized for different devices and such batteries may be color coded (e.g., batteries for an HMD may be RED while batteries for a controller are GREEN). Different types of batteries may be configured to operate on the same recharging interface or, for example, game system 1010 may include different types of recharging ports which also may be color coded to correspond to the types of batteries the recharging ports are operable to recharge.

For example, controller 1021, or any device, may include a battery port 1021 with power indicator 1022. Battery port 1021 may be utilized to couple a battery to a controller such that the controller can be powered from a battery in battery port 1021. Controller 1020 may include memory input 1023 for receiving memory and reading/writing information from/to the memory. Controller 1021 may include interface 1024 that is coupled to a wire that may be inserted into port 1013. Glove controllers, wireless routers, head mounted displays, foot controllers, or any other additional controller or gaming device may be operable to be powered, at least partially, by a rechargeable battery that can be recharged, for example, by a recharging port on system 1010. Persons skilled in the art will appreciate that any controller may include a wire-based link for interfacing with game system 1010 and any such wire-based link may provide power to the device from system 1010. As such game system 1010, or any controller or HMD, may include any type and any number of power regulation devices.

Figure 11:
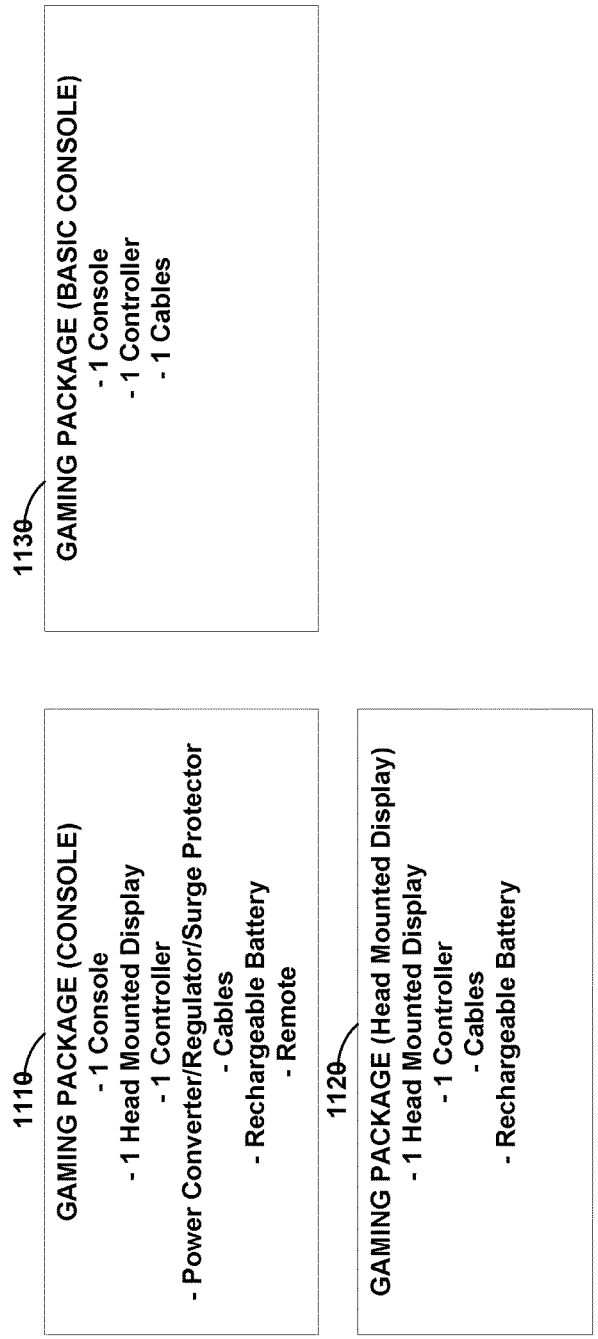
FIG. 11 are video game packages constructed in accordance with the principles of the present invention.

FIG. 11 shows game package schemes 1100 that may include game package 1110, 1120, and 1130. Persons skilled in the art will appreciate that game systems may be packaged with a variety of different devices and that such packages increase the whimsical and festive nature of both the game system, the devices, and the package itself. Providing packaging with a whimsical and festive nature may directly increase the commercial success of a particular package.

Game package 110 may include, for example, a console, a head mounted display, a controller, a power converter/regulator/surge protector, cables (e.g., cables to connect to different types of television sets such as coaxial, audio/video, and component cables), a rechargeable battery (or two or more rechargeable batteries), and a remote control (e.g., for playing a media inserted into a media player that is not game media such as a HD DVD movie). Gaming package 1110 may, for example, include additional components or may include less components. Gaming package 1110 may, for example, not include a power converter/regulator. Additionally, the controller may, for example, be a wireless (or wire-based) controller and the HMD may be a wire-based (or wireless HMD). Package 1120 may include, for example, a HMD, wireless controller, television interface cables, and two rechargeable batteries (or one or any number of rechargeable battery). Gaming package 1130 may include, for example, a console, a controller, and television interface cables. A gaming package may also include, for example, a particular game (and components that are designed around the theme of the game) or a game demo and advertising/operational manuals.

Figure 12:
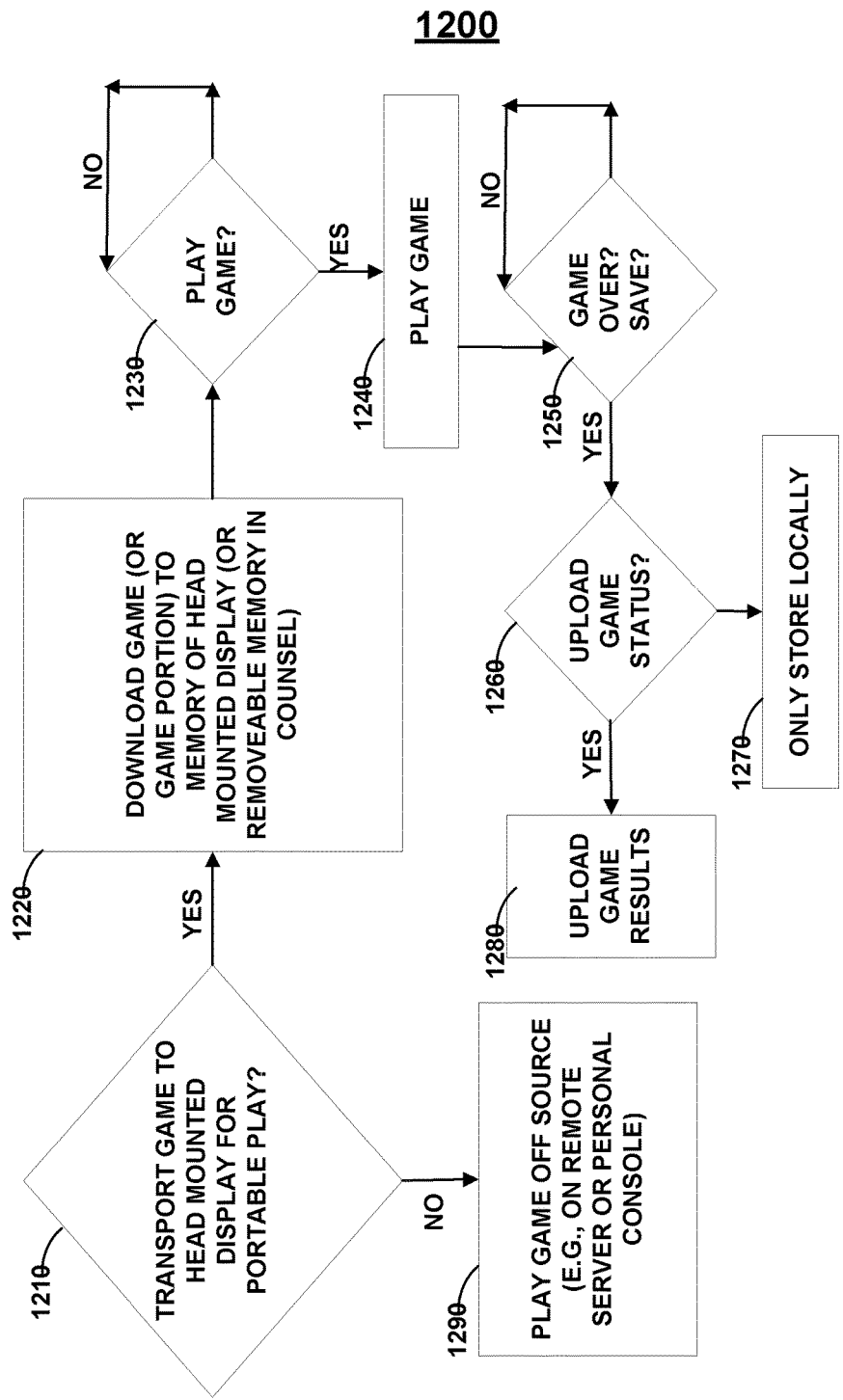
FIG. 12 is a flow chart of a video game process constructed in accordance with the principles of the present invention.

FIG. 12 shows process 1200 that may include, for example, step 1210 in which a game may be transported (e.g., downloaded) or inserted into a HMD, or portable system, for portable play. Step 1210 may, for example, be utilized to play the game off the source of where the game is being read (e.g., from an insertable game medium in a stationary game system or located in the memory of a remote server) so that the game may be transported (e.g., downloaded) into the portable system (e.g., HMD-based system). Step 1210 may be utilized to transport the game from a portable, handheld gaming system to the HMD. Persons skilled in the art will appreciate that a game may be transferred from an insertable storage medium (e.g., game disc) into the Random Access Memory (RAM) of a video game system (e.g., a portable game system such as a HMD-based portable game device or a stationary system).

Step 1220 may be provided, for example, to download the game (or a game portion) to, for example, the memory of the HMD (or removable memory that can be inserted into a HMD or a game system electrically coupled to the HMD).

Step 1230 may be utilized to determine when a user desires to play a game and the game may be played in step 1240. Step 1250 may be utilized to determine whether the game is over or the game progress is desired to be saved. Step 1260 may be utilized to upload the game status (e.g., to a remote server or to a game system) and/or store locally in step 1270. Step 1280 may upload game results.

Figure 13:
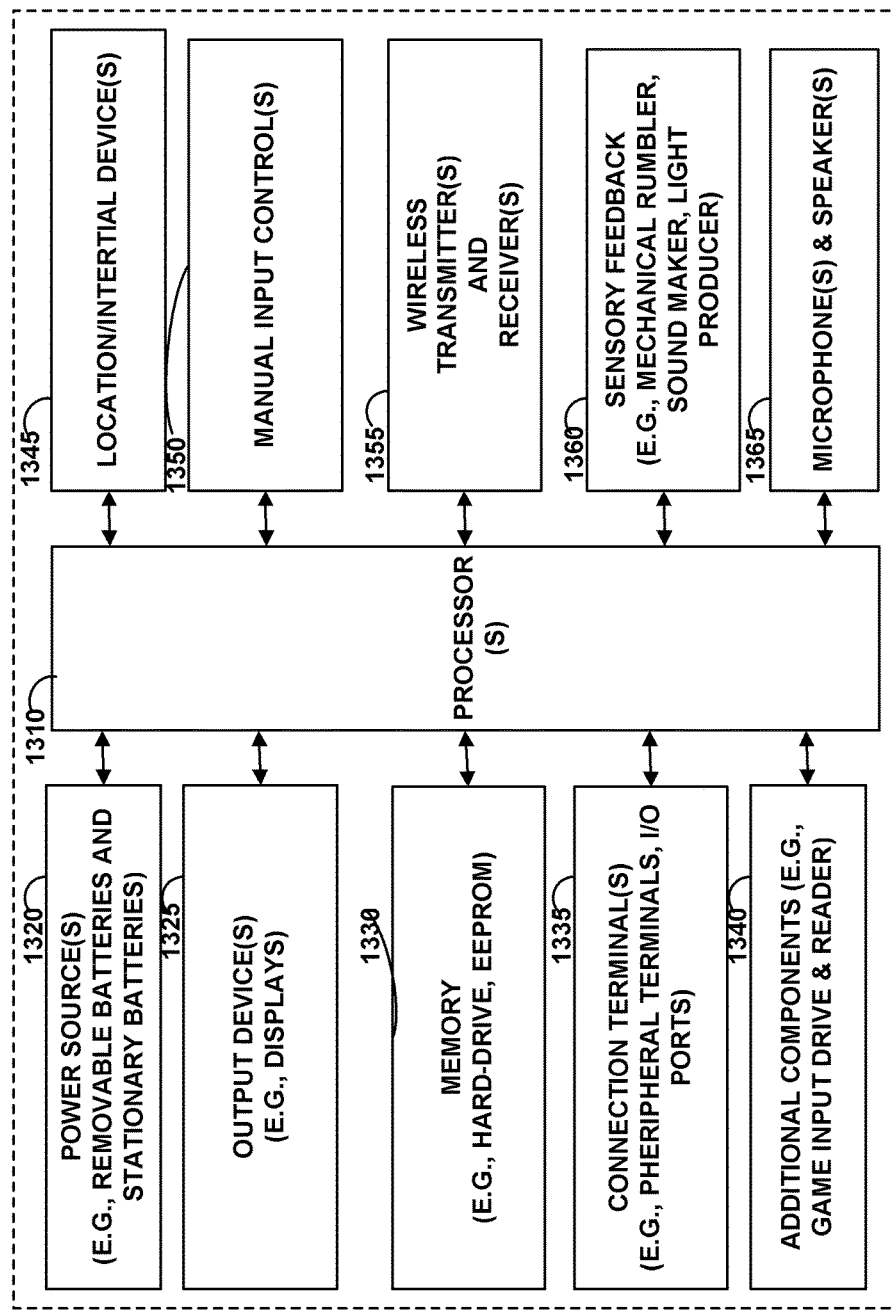
FIG. 13 is an illustration of an architecture constructed in accordance with the principles of the present invention.

FIG. 13 shows architecture 1300 that may be utilized for a game system (e.g., a portable game system or a stationary game system). Persons skilled in the art will appreciate that components may be added to, or removed from, architecture 1330. For example, architecture 1330 may include one or more processors 1310, power sources 1320, output devices 1325, memory 1330, connection terminals 1335, additional components 1340, location/inertial sensing devices 1245, manual input controls 1350, wireless transmitters/receivers 1355, sensory feedback 1360 (e.g., mechanical rumbler, additional sound maker, light producer), and/or microphones/speakers 1365.

Figure 14:
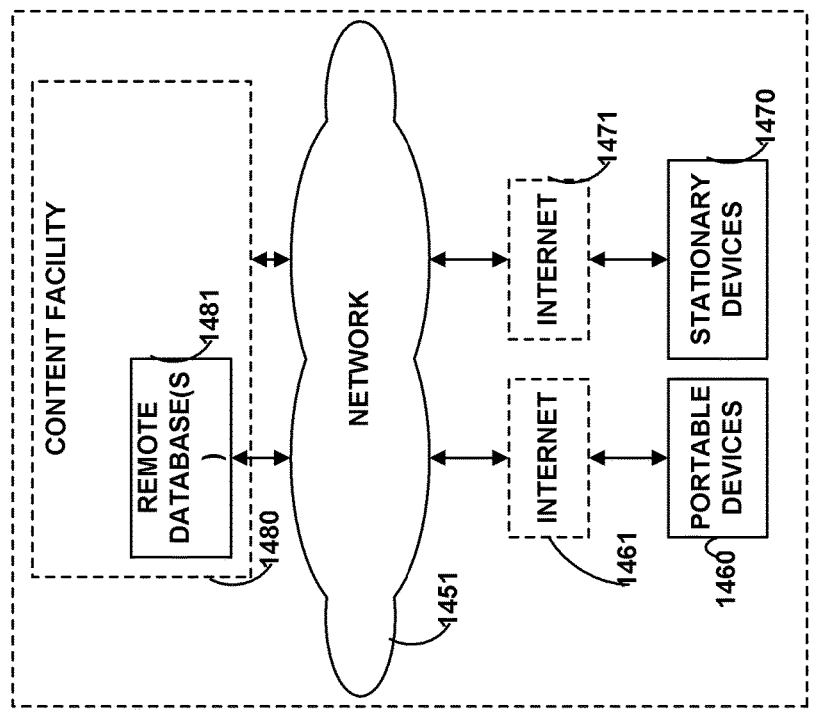
FIG. 14 is an illustration of a network topology constructed in accordance with the principles of the present invention.

FIG. 14 shows network 1400 topology that may be utilized. Network 1451 may be utilized to communicate information from, for example, content facility 1480 to portable game devices 1460 or stationary game devices 1470. The internet, or an internet, may be utilized to facility the communication. Content facility 1480 may, for example, allow video games to be downloaded to gaming devices, progress to be uploaded, and scores to be uploaded (for online competitions). Information may be stored on remote databases 1481. Persons skilled in the art will appreciate that content facility 1480 may also be utilized to facility multi-player games by routing information (e.g., information on the game's progress and player movements) between players that are located remotely from one another.

Figure 15:
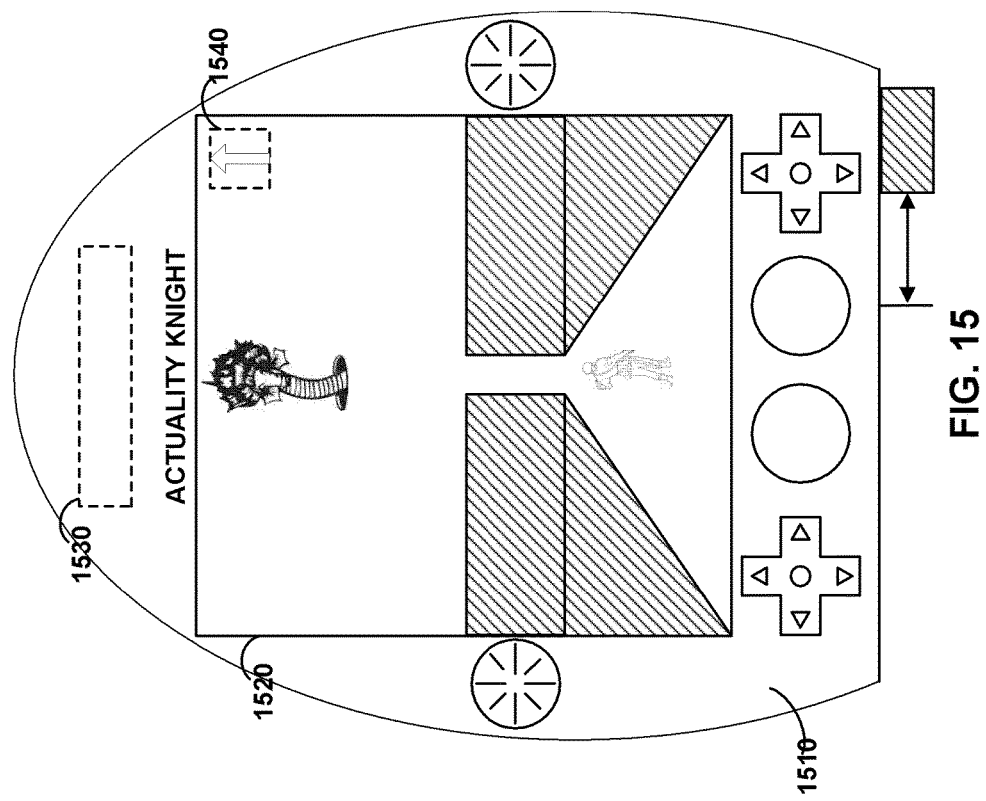
FIG. 15 is a handheld video game constructed in accordance with the principles of the present invention.

FIG. 15 shows portable game system 1510 that may include game display 1520 and any number of inertial and/or positioning sensors 1530. Portable game system 1510 may be a wireless telephone (e.g., a cellular phone) that is operable of making telephone calls in addition to playing video games. One or more directional indicia 1540 may be utilized to show the direction that device 1510 is moving in. Three dimensional indicia may be utilized to depict the pitch/roll/tilt of a device. As such, system 1510 may include any number of inertial and positioning devices to determine the direction system 1510 is facing, the pitch, roll, and tilt of system 1510 and the velocity and acceleration of system 1510 in any direction (e.g., how fast the system rolls, pitches, tilts, moves, and/or the distance the system displaces). Additional information may be displayed indicative of the velocity and acceleration of the movement of the device. Multiple controls may be provided as well as multiple speakers and microphones. A portable system may include a game media port for playing new games or the game system may be dedicated to one or more games and may not include a game port (or an ability to wireless download games or play games over a wireless connection).

A location-based game may be provided where a players physical movements correlate to a video game characters virtual movements. Particularly, the location of a device (e.g., the changes in a position of a device) may be utilized to move a virtual character. Such location information may be obtained from any number of positioning systems (e.g., GPS, Galileo, or a local positioning system) and/or inertial sensors. Persons skilled in the art will appreciate that inertial sensors may be utilized to provide a positioning system by utilizing velocity/acceleration/directional information to determine changes in a user's position. Positioning systems may utilize inertial information to update location approximations during periods when the positioning system is unable to update a location approximate on its own (e.g., between receptions of GPS signals).

Persons skilled in the art will appreciate that a game can be programmed to help minimize errors that result from error accumulations in inertial sensors such as accelerometers and gyroscopes. For example, a game may be programmed with narrow passageways at particular points in the game such that the need for complex movement information is minimized (e.g., the game can just determine movement in the direction of the passageway to move a character and does not need to use other movement information). Such passageways can also be utilized to determine errors as a person walking through the passageway would be expected to walk through the passageway and not hit a wall. If the game receives information that a user has hit a wall, the game may be able to assume that such readings are errors and the game can try to negate such errors from future readings. Similarly, a video game character can be told to stop at particular times (e.g., at particular save checkpoints, or level completion points, or when talking to a character) such that inertial errors can be detected and/or inertial systems can be reset and/or recalibrated. Such checkpoints that are built into the game may also allow, for example, some positioning systems (e.g., GPS systems) to update the location before game progress continues such that a reference point is established when a user is not moving.

FIG. 16 shows game systems 1610 and 1620. A game may be provided in which a character is always aligned with an alignment line (e.g., alignment line 1625 or 1675). Such a line may be, for example, a vertical line or a horizontal line (and may be transparent to a user). Thus, the character will move along the line if movement occurs along the line, but if movement occurs not along the line, the game will scroll such that the game environment moves. Such an alignment line may allow a character to always be positioned in a particular area of the game such that a particular portion of the environment may always be seen on all, or a particular side, or a character. An alignment point may be provided such that the character never moves (e.g., is always center on the screen) and user movements are used to move the character through the virtual environment by scrolling the virtual environment with respect to the virtual character. Such an alignment line may be centered.

FIG. 17 shows systems 1710 and 1720 with a vertical alignment line (e.g., line 1725 and 1775) that is off-centered (e.g., approximately 75-95% on one side of the display).

FIG. 18 shows game systems 1810 and 1820 that may include alignment areas (e.g., alignment areas 1825 and 1875). A character may move freely within an alignment area (e.g., a centered box) but when the character hits the perimeter, the character may not, for example, move through that perimeter. Instead, the game environment may scroll such that the character can always move but is always within the alignment area. Manual game controls may be provided or transparent game controls may be provided (e.g., via positioning and/or inertial movement sensors).

FIG. 19 shows gaming devices (e.g., dedicated portable gaming devices) that may be shaped similar to a tool used in a game such as, for example, a gun or shovel. For example, a gaming device may be coupled to a shovel and a user may move around a virtual environment my walking with the shovel and the user may dig in a particular location in the virtual environment by stopping and moving the shovel in a particular manner (e.g., digging). The GUI on the shovel may then sense such movement and may switch from displaying one environment (e.g., a treasure map or virtual world) to another display (e.g., a mini-game or digging/action indicia such as a display associated to the particular type of movement).

Persons skilled in the art will appreciate that one or more cameras can be coupled to a HMD, or attached to a particular portion of a user's body (e.g., shoulder). Such a camera may, for example, take video of the user's surroundings. If attached to a HMD, the camera may point towards the front of the HMD such that the camera substantially captures the user's perspective of his/her environment. Such pictures may be processed by the HMD, a game system, or another device and utilized to provide information that may assist in providing a video game. For example, a HMD may have a non-transparent screen, but may provide an augmented reality game by using a camera. More particularly, a camera may continually capture the user's perspective, add video game indicia to the captured pictures/video, and then display the new composite pictures/video to a user on the non-transparent display. Persons skilled in the art will appreciate that such composite pictures/video may be provided on a transparent display. As such, a user may be able to see his/her surroundings while using a non-transparent display so that the user can move freely (e.g., run) in his/her actual environment and interact with video game indicia added to the pictures/video of his/her actual environment. Processing a picture/video of an environment may provide different types of information to a game system. For example, a picture/video may be processed to determine the landscape of a user's environment as well as any objects that are located in the user's environment (e.g., tree). As per another example, processing a picture/video may assist in determining the lighting of a user's environment. Alternatively still, processing a picture/video may assist in determining other players that are in a user's environment. For example, reflective devices may be placed on other HMDs such that processing a picture, or using additional sensors, may determine the location of such reflective devices such that other players can be located. The information from a camera may be shared to other HMDs. For example, if playing a multi-player game, a user on your team may view a friendly user's camera information such that members of the same team can perform better (e.g., coordinate attacks on an enemy). A camera may also be pointed towards a user's face such that communications to other users may include such camera information. Thus, a user may be able to see another user on a portion of his/her HMD and may communicate to that user.

A video game system may also use a camera to provide picture/video data to a game console to affect the picture/video data that is provided to a stationary television set. For example, a camera may be utilized to capture the picture/video of a player such that the picture/video may be utilized to generate a video game player.

Persons skilled in the art will also appreciate that the present invention is not limited to only the embodiments described. Instead, the present invention more generally involves providing video games. As such, for example, rechargeable battery ports may be utilized in a game system that is not operable to couple to a HMD or gaming devices with inertial/positioning sensors. Persons skilled in the art will also appreciate that the apparatus of the present invention may be implemented in other ways then those described herein. All such modifications are within the scope of the present invention, which is limited only by the claims that follow.

What is claimed is:

1. A video game system comprising:
    a console operable of playing a video game having a television connection structure operable to electrically couple to a television and a head mounted display input/output connection structure;
    a controller operable of being electrically coupled to said console to control the movement of a game character in said video game; and
    a head mounted display operable of being electrically coupled to said head mounted display input/output connection structure of said console, wherein said head mounted display receives video game indicia associated with said video game from said console through said head mounted display input/output connection structure of said console, said head mounted display displays said video game indicia from the perspective of said game character, and said head mounted display provides a video game control signal to said head mounted display input/output connection structure of said console.

2. A video game package comprising:
    a video game console having a head mounted display input/output connection;
    a controller operable to communicate with said video game console;
    a power cord operable to connect to said video game console for powering said video game console; and
    a head mounted display operable to connect to and be removed from said video game console through said head mounted display input/output connection structure, wherein said head mounted display is operable to receive signals from said console through said head mounted display input/output connection and said head mounted display is operable to communicate a video game control signal from said head mounted display to said video game console through said head mounted display input/output connection structure.

3. A video game system comprising:
a video game console for providing a game;
a television;
a non-television device located about said television;
a display, wherein said display is head-mounted and indicia associated with said game are operable to be received via an input/output connection structure, wherein said indicia is operable to be displayed on said display, and said display provides a video game control signal to said input/output connection structure; and
a controller operable to communicate with said video game console, wherein said device transmits signals, said controller receives said signals, and said controller uses said received signals to determine the distance from said controller to said device.

4. The video game system of claim 3, wherein said display is a transparent display.

5. A video game system comprising:
a video game console operable of receiving an insertable storage medium storing a video game, wherein said video game console plays said video game and said video game console is operable of being connected to a television set to display an initial setup screen for said video game;
a first controller operable to communicate a control information for said video game, wherein said first controller comprises a first inertial movement sensor to provide a first control, said control information includes said first control, and said first controller is operated by a first battery located in said first controller; and
a non-transparent head mounted display operable of displaying said video game in virtual reality on said non-transparent head mounted display, wherein said head mounted display includes a second inertial movement sensor to provide a second control and said second control is communicated to said video game console for determining how said video game is displayed on said head mounted display and said head mounted display is operated by a second battery located in said head mounted display.

6. A non-transitory programmable logic device having program logic imprinted therein for performing a method of playing a video game comprising:
initiating the start of a video game;
providing a plurality of selectable game topologies for said video game;
selecting a game topology from a list that includes said plurality of selectable game topologies, wherein said plurality of game topologies includes:
a virtual reality game topology where indicia associated with said video game is operable to be received via an input/output connection structure and said received indicia are operable to be displayed on at least a head mounted display; and
a television set game topology wherein said video game is operable to be displayed on at least a television set.

7. A video game system comprising:
a console operable of playing a video game having a television connection, a controller port, and a rechargeable battery slot located at least partially inside of said console;
a controller operable to couple to the controller port having a controller slot to receive a rechargeable battery, wherein said rechargeable battery is operable to be recharged in said rechargeable battery slot and operable to power said controller in said controller slot.

8. The video game system of claim 7, wherein said console includes a second rechargeable battery slot located at least partially inside of said console and a second rechargeable battery is operable to be recharged in said second rechargeable battery slot and operable to power said controller in said controller slot.

9. The video game system of claim 7, further comprising a power indicator associated with said rechargeable battery slot operable to indicate the amount of charging that has occurred by said rechargeable battery slot.

10. The video game system of claim 7, further comprising a head mounted display.

11. The video game system of claim 7, further comprising a head mounted display having a head mounted display slot, wherein said head mounted display slot is operable to receive said rechargeable battery to power said head mounted display.

\* \* \* \* \*